(12) United States Patent
Hoersten et al.

(10) Patent No.: US 9,886,809 B2
(45) Date of Patent: Feb. 6, 2018

(54) ARTICLE DISPENSING MACHINE AND METHOD FOR AUDITING INVENTORY WHILE ARTICLE DISPENSING MACHINE REMAINS OPERATIONAL

(75) Inventors: Eric J. Hoersten, Chicago, IL (US); William E. Caputo, Naperville, IL (US); Thomas Franklin Smith, Jr., Downers Grove, IL (US); William Martinka, Chicago, IL (US); Jim Polubinski, Jr., Palos Hills, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 604 days.

(21) Appl. No.: 13/588,967

(22) Filed: Aug. 17, 2012

(65) Prior Publication Data

US 2013/0131863 A1    May 23, 2013

Related U.S. Application Data

(63) Continuation-in-part of application No. 12/833,754, filed on Jul. 9, 2010, which is a continuation of application No. 11/863,909, filed on Sep. 28, 2007, now Pat. No. 8,712,872, and a continuation-in-part of application No. 13/414,612, filed on Mar. 7, 2012, now Pat. No. 8,768,789.

(51) Int. Cl.
| | |
|---|---|
| *G07F 9/02* | (2006.01) |
| *G06Q 10/08* | (2012.01) |
| *G06Q 99/00* | (2006.01) |
| *G07F 5/18* | (2006.01) |
| *G07F 11/00* | (2006.01) |
| *G07F 17/16* | (2006.01) |
| *G07F 11/54* | (2006.01) |

(52) U.S. Cl.
CPC .......... *G07F 9/026* (2013.01); *G06Q 10/087* (2013.01); *G06Q 99/00* (2013.01); *G07F 5/18* (2013.01); *G07F 11/002* (2013.01); *G07F 11/54* (2013.01); *G07F 17/16* (2013.01)

(58) Field of Classification Search
CPC ......... G07F 9/026; G07F 5/18; G06Q 10/087; G06Q 99/00
USPC ...... 705/28, 22; 221/133; 700/242, 230, 228
See application file for complete search history.

(56) References Cited

U.S. PATENT DOCUMENTS

| | | | | |
|---|---|---|---|---|
| 4,369,442 | A * | 1/1983 | Werth ...................... | G07F 9/08 194/217 |
| 6,010,239 | A * | 1/2000 | Hardgrave et al. ........... | 700/213 |
| 7,542,298 | B1 * | 6/2009 | Le Graverand .... | G11B 15/6835 361/752 |
| 7,823,778 | B1 * | 11/2010 | Singh ................... | G06Q 10/087 235/375 |
| 8,190,497 | B2 * | 5/2012 | O'Dell ............... | G06K 17/0022 235/375 |

(Continued)

*Primary Examiner* — Vanel Frenel
(74) *Attorney, Agent, or Firm* — James P. Muraff; Neal, Gerber & Eisenberg LLP

(57) ABSTRACT

An article dispensing machine capable of performing an inventory audit of a portion of the inventory and automatically pausing the inventory audit in response to a customer transaction request and method for performing the same are shown. After completing the customer request, the article dispensing machine resumes the inventory auditing process. The article dispensing machine thereby remains available for customer use during the inventory auditing process.

34 Claims, 8 Drawing Sheets

(56) References Cited

U.S. PATENT DOCUMENTS

| | | | |
|---|---|---|---|
| 2002/0046122 A1* | 4/2002 | Barber | G06Q 10/087 |
| | | | 705/17 |
| 2007/0179668 A1* | 8/2007 | Mellin | 700/234 |
| 2008/0027835 A1* | 1/2008 | LeMasters | G06Q 10/087 |
| | | | 705/28 |
| 2008/0249658 A1* | 10/2008 | Walker et al. | 700/236 |
| 2012/0123587 A1* | 5/2012 | Mockus et al. | 700/230 |
| 2012/0239189 A1* | 9/2012 | Jaud | G07F 9/023 |
| | | | 700/236 |
| 2013/0310970 A1* | 11/2013 | Segal et al. | 700/242 |
| 2014/0025545 A1* | 1/2014 | Carson | G06Q 30/018 |
| | | | 705/29 |

* cited by examiner

ARTICLE DISPENSING MACHINE AND METHOD FOR AUDITING INVENTORY WHILE ARTICLE DISPENSING MACHINE REMAINS OPERATIONAL

CROSS-REFERENCE TO RELATED APPLICATIONS

This application is a continuation-in-part application of U.S. patent application Ser. No. 12/833,754, filed on Jul. 9, 2010, entitled "Article Vending Machine and Method for Auditing Inventory While Article Vending Machine Remains Operational," and a continuation-in-part of U.S. patent application Ser. No. 13/414,597, filed on Mar. 7, 2012, entitled "System and Method for Optimizing Utilization of Inventory Space for Dispensable Articles," and a continuation-in-part of U.S. patent application Ser. No. 13/414,612, filed on Mar. 7, 2012 entitled "System and Method for Optimizing Utilization of Inventory Space for Dispensable Articles", all of which are incorporated herein by reference in their entirety.

TECHNICAL FIELD

The invention set forth herein relates to improvements in article dispensing systems and components and methods related to the same. More particularly, the invention set forth herein relates to a digital video disc (DVD), Blu-Ray disc, and/or video game disc distribution system.

BACKGROUND AND SUMMARY OF THE INVENTION

While the invention is often described herein with reference to a digital video disc, Blu-Ray disc, and video game distribution system, an application to which the invention disclosed herein is advantageously suited, it will be readily apparent that the invention is not limited to that application and can be employed in article dispensing systems used to distribute a wide variety of dispensable articles.

The market for digital video disc (DVD), Blu-Ray movie video, and video game rentals is enormous and growing. In 2003, brick-and-mortar stores dominated the movie video and video game rental landscape in the United States. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicate that there was a significant market potential for aligning regular routines of consumers (e.g., shopping, getting coffee or gas or going to a convenience store) with their DVD, Blu-Ray disc, and video game rental activities.

One improved article dispensing machine is disclosed in commonly owned U.S. Pat. No. 7,234,609, which is herein incorporated by reference in its entirety. The invention of U.S. Pat. No. 7,234,609 and the invention set forth herein can function as an article dispensing machine-based distribution system that will typically have multiple units of each new release per article dispensing machine. The dispensing machines of U.S. Pat. No. 7,234,609 and the invention set forth herein can stock up to two thousand DVDs, Blu-Ray discs, video games, or other discs (movies, games or other entertainment content), making the system competitive with brick-and-mortar video rental superstores at a fraction of the cost.

The dispensing machine and system of U.S. Pat. No. 7,234,609 and the invention set forth herein distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of U.S. Pat. No. 7,234,609 and the invention set forth herein yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours (e.g., 24 hours a day, 7 days a week). The invention set forth herein employs a more cost-effective, convenient platform than brick-and-mortar stores. In addition, with this invention, article dispensing machines can be situated in retail locations having high foot traffic, such as at a popular grocery store, restaurant, drug store, and/or other popular retail location.

The dispensing machine of U.S. Pat. No. 7,234,609 and the invention set forth herein can be operated at a substantial savings over the costs associated with traditional brick-and-mortar video rental stores. For example, the invention disclosed herein does not require hourly employees to continuously man the dispensing machines or restock them with inventories.

Unlike brick-and-mortar stores, the dispensing machine of U.S. Pat. No. 7,234,609 and the invention set forth herein does not require an on-site store manager because all operational decisions can be made at a centralized location by a management team in an office remote from the retail locations. Unlike brick-and-mortar stores, the dispensing machine of U.S. Pat. No. 7,234,609 and the invention set forth herein does not require significant physical space. Unlike brick-and-mortar stores, the dispensing machine of U.S. Pat. No. 7,234,609 and the invention set forth herein has low operating costs because heating or air conditioning is not necessarily required for the dispensing machines and because they consume a relatively low level of electrical energy. In addition, the dispensing machine of U.S. Pat. No. 7,234,609 has low maintenance costs and downtime.

The dispensing machine of U.S. Pat. No. 7,234,609 and the invention set forth herein addresses the shortcomings of traditional brick-and-mortar stores in a convenient and cost-effective delivery vehicle having the added bonus of serving as an effective promotional platform that drives incremental sales to retail locations in which the machines may be housed. In addition, the dispensing machine of U.S. Pat. No. 7,234,609 and the invention set forth herein overcomes these disadvantages by at least offering more new releases and older selections for any given time period, and lower cost per viewing with significantly more convenience than Internet-based and pay-per-view services.

The dispensing machine of U.S. Pat. No. 7,234,609 and the invention set forth herein is a fully automated, integrated DVD, Blu-Ray disc, and video game disc rental and/or purchase system. It preferably incorporates robust, secure, scalable software that provides a fully personalized user experience and real-time feedback to retail locations and advertisers, scalable hardware that leverages existing technologies such as touch screen, focused audio speakers and video monitors, and technology utilizing the Internet through a system website or mobile/consumer electronics device application. These technologies and others fill long-felt needs in the art and give advantages over conventional video distribution options.

By utilizing the dispensing machines and the fully-interactive, real-time, linked Internet website or mobile/consumer electronics device applications, consumers can rent one or more DVDs, Blu-Ray discs, video games discs, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

Another benefit of the invention set forth herein is that it allows for optimizing the utilization of inventory space for articles dispensable from an article dispensing machine by improving the sorting, removal, and loading of the inventory of articles. A list identifying a subset of articles targeted for removal from the article dispensing machine may be received. The subset of articles may include at least thinned articles, damaged articles, fraudulent articles, do not rent (DNR) articles, rebalancing articles, and/or a combination of these subsets that are to be removed from the article dispensing machine. Further refined subsets of a subset of articles may also be defined. The subset of articles may be moved from a non-removable storage unit in the article dispensing machine to a predetermined area. The predetermined area may include a merchandising zone of the storage unit and/or a separate article removal bin. Inventory management may then be initiated through the receipt of a command from a field service representative. The field service representative may remove each subset of articles from the predetermined area(s) and confirm that the subset of articles was removed. The field service representative may also load new articles into the predetermined area. Loading of the new articles may be confirmed. The new articles may be held in the predetermined area for a preset amount of time, for example, until the new articles are designated as available for rental or sale (e.g., dispensable). Articles that are designated as dispensable may be moved from the predetermined area to the storage unit. The status of each of the articles may be tracked in an inventory database.

The invention set forth herein has the advantage of quicker and more efficient removal of articles from and loading of articles to an article dispensing machine because the articles may be removed from and loaded to the same predetermined area. Moreover, the wear and tear on mechanics of the article dispensing machine and downtime due to mechanical breakdowns may be reduced through use of the invention. Cost savings due to less downtime, maintenance, and time for removing and loading articles may also result.

In addition, the invention set forth herein can provide a method for automated inventory control so that electronic data records can be kept related to inventory control for each dispensing machine within a network of such machines. For example, automatic inventory tracking may take place during dispensing and/or return of articles by the article dispensing machine.

However, despite the automatic inventory tracking capabilities of these dispensing machines, it is useful for these machines to be able to perform an inventory auditing process that independently verifies the inventory of the machine. In one embodiment, during an inventory auditing process, the machine reads the information coded on each dispensable article and may correlate that information to the location of the dispensable article within the machine. A dispensable article may be any article stored in the article dispensing machine that is available for consumption (e.g., rental and/or sale) by a consumer. The correlation of the dispensable article and its location are stored in a database. Such an inventory auditing process is also useful if the stored inventory data is lost or damaged. Such an inventory auditing process may also be used when a large portion of the machine inventory is changed out. Prior inventory auditing processes rendered the machine unusable to customers because the components used for customer transactions were the same as the components used for the inventory auditing process. Specifically, for example, a scanner, selector arm, a processor, and a database are used during the inventory audit and are also used during customer rental, purchase, and return of articles. Since at least some of these same components in the prior machine were needed for customer transactions, a customer would be unable to use the machine while the machine was performing an inventory audit.

The invention set forth herein permits a customer to perform a transaction, such as a rental, purchase or return, while the inventory auditing process is being performed. This permits the inventory auditing process to be performed at any time without limiting the hours of operation of the machine and without lost sales and dissatisfied customers who are unable to use the machine while it performs an inventory audit. However, where inventory has been placed in a predetermined area for removal from the machine, it may not be necessary to audit such inventory.

Thus, the invention set forth herein is directed to a method and apparatus for an article dispensing machine that permits the machine to perform a customer transaction while the machine performs an inventory audit that excludes a predetermined area. In one embodiment, the method includes the initiation of the inventory auditing process. The initiation of the inventory auditing process may occur either automatically or manually via a request from an administrator. The inventory auditing process is controlled by a computer program and, thus, initiation of the inventory auditing process comprises initiation of the computer program and method therein. The computer program may be run as a background program or may be run on a partitioned operating system or other automated arrangement, thereby permitting a customer to interact with the machine operating system and allowing the processor to perform various routines while it runs the inventory auditing program.

During the inventory auditing process, a selector arm located in the machine and having a first sensor attached to it is positioned adjacent a plurality of storage compartments located within the machine. At each storage compartment, the first sensor detects the presence or absence of an article in the storage compartment. If an article is present, the article is removed from the compartment by a picker. The picker then aligns a code on the article with a second sensor that reads information from the code. The information from the code is transferred to a database along with information relating to the location of the storage compartment. If, on the other hand, no article is present in a storage compartment, that information and the location of the storage compartment is transferred to the database. Alternatively, the information from the article and/or the location of the storage bin may be compared to the values in a pre-existing database, thereby verifying the accuracy of the pre-existing database. After the information is read for one compartment, the selector arm is aligned with the next compartment. The article or lack thereof in each compartment is read by the first sensor until the process is stopped or until all compartments have been checked/read.

If the storage unit of the article dispensing machine includes a predetermined area (e.g., a merchandising zone and/or an article removal bin), the inventory auditing process may be configured to not audit the predetermined area. To this extent, the storage compartments located within the predetermined area may be designated as "non-auditable storage compartments," while the remaining compartments may be "auditable storage compartments." A list of non-auditable storage compartments may be compiled and used by the controller to determine which compartments to bypass during the inventory auditing process. In one embodiment, the auditable or non-auditable designation for each storage compartment is based on a status of the media article stored therein. For example, storage compartments holding dispensable media articles may be designated as auditable compartments. Likewise, storage compartments holding non-dispensable media articles may be designated as non-auditable compartments.

During the inventory auditing process, a user interface, such as a touch screen or keypad, remains available for use by a customer. Using the user interface, a customer may initiate a transaction that requires the use of the sensor and selector arm, such as a video rental, purchase process or return. In response to the requested transaction, the computer pauses the inventory auditing program. The various components of the machine perform the transaction requested by the user, which may require the sensor to read information from the returned or requested video and may further require transport of the returned or requested video.

When the transaction is completed, the inventory auditing process is resumed. The inventory auditing process resumes at the point at which it was paused and continues to scan each auditable storage compartment until completion of the program. Other features and advantages are provided by the following description and drawings.

DETAILED DESCRIPTION OF THE INVENTION

Figure 1:
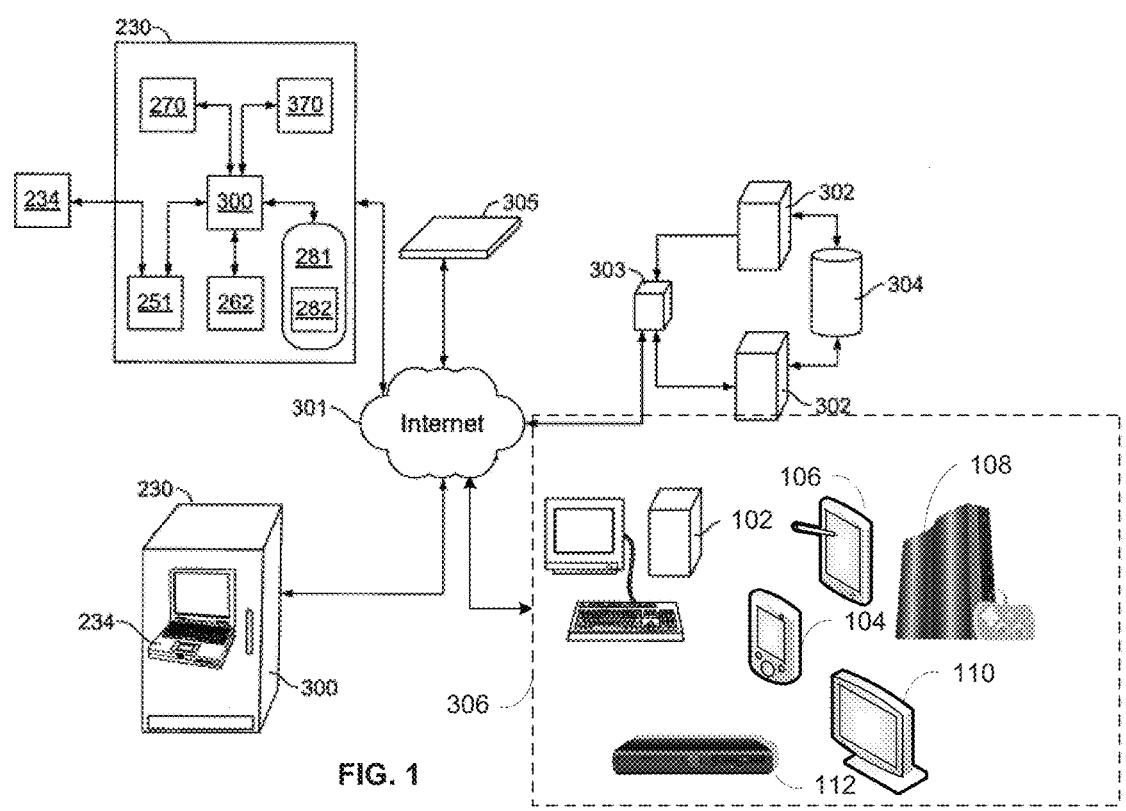
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated herein.

FIGS. 1-5 illustrate an article dispensing machine 230 that is one of a plurality of article dispensing machines included within an article distribution system having a plurality of such machines situated at a plurality of retail locations. The article dispensing machines of a particular article distribution system preferably form a network. As such, those machines are preferably in communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor 300 is capable of executing various programs to provide input to and/or receive outputs from the peripheral devices. Suitable processors for such use are known to those of skill in the art. In addition, the processor 300 is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor 300. Article dispensing machine memory storage device includes an article dispensing machine database 282. Article dispensing machine database 282 stores information regarding, among other things, the inventory of the article dispensing machine and the position of each article within the inventory of the article dispensing machine.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Generally, in terms of hardware architecture, the central server 302 includes a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the convent provider backend 308 would be understood by one of skill in the art and are encompassed within the scope of the invention set forth herein.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the invention set forth herein may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the invention set forth herein can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua. frequency (RF) or other transceiver, a telephonic interface, a bridge, and a router.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the invention and the O/S, in whole or in part, but typically the latter, are read by processor, perhaps buffered within the processor, and then executed.

When the invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The invention set forth herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment is for article dispensing machine 230 to have a "broadband" connection to the network 301, the principles of the invention set forth herein are also practicable with a dialup connection using a standard modem. Wireless network connections are also contemplated, such as wireless Ethernet, satellite, infrared, radio frequency networks, Bluetooth, near field communication, and cellular networks.

The central controller 302 communicates with the article dispensing machine controller 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in a "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the article inventory at each of the plurality of article dispensing machines 230. The central database 304 also stores sales information regarding the sales quantities of the merchandise stored in the machines 230. For example, the central database 304 stores information regarding the sales totals for each title and for each machine 230 at each retail location. Central database 304 also stores user information and rental transaction information, such as user IDs, the date on which articles are due to be returned, the date on which articles were rented from the machines 230, and a list of valid coupon codes and restrictions associated with those codes. In certain embodiments, central database 304 also may be configured to store user PINs. Some of this information is also preferably stored in article dispensing machine database 282.

Central database 304 is preferably a relational database, although other types of database architectures may be used without departing from the principles of the invention set forth herein. For example, the database 304 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304. In one embodiment, .net and Microsoft Reporting Services are employed, however, other technologies such as ODBC, MySQL, CFML and the like may be used.

The central controller 302 and central database 304 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302 and/or the central database 304 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application executed on the electronic device 306 may also access the central controller 302. To that end, central controller 302 preferably comprises web server software such as IIS or Apache. It will be understood that a variety of web server software and web browser software exists to implement the principles of the invention set forth herein without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302 and the central database 304 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

Figure 2:
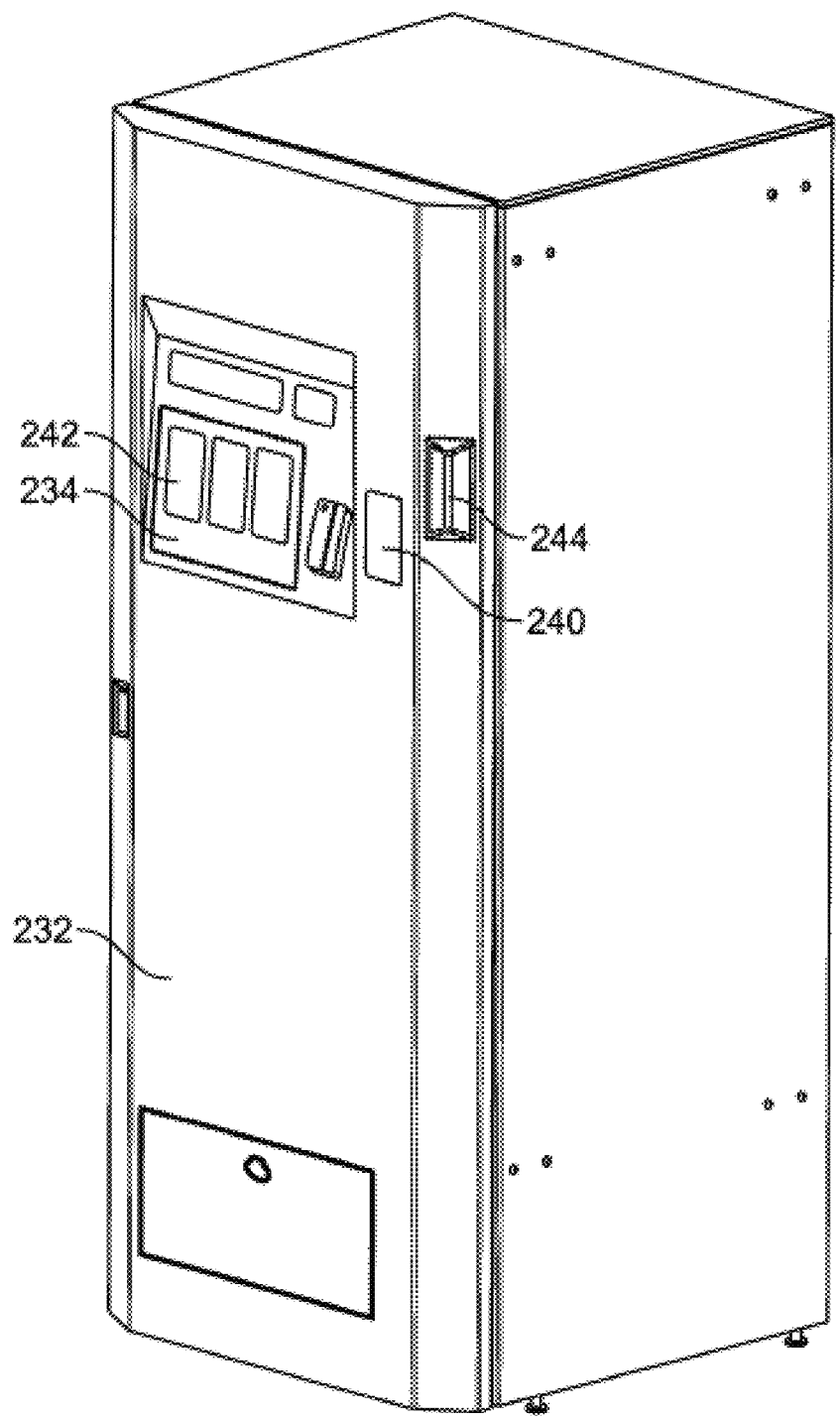
FIG. 2 is a perspective view of an article dispensing machine constructed in accordance with the principles of the invention disclosed herein.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection or can represent a reference number for use by the customer when contacting customer service, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas.

Dispensing machine 230 also preferably includes speaker units 246. Known audio technology may be incorporated within dispensing machine 230 to broadcast focused audio directed to relatively small (e.g., three square feet) locations in front of the machines from speaker units and/or in other designated locations at a retail site.

Figure 3:
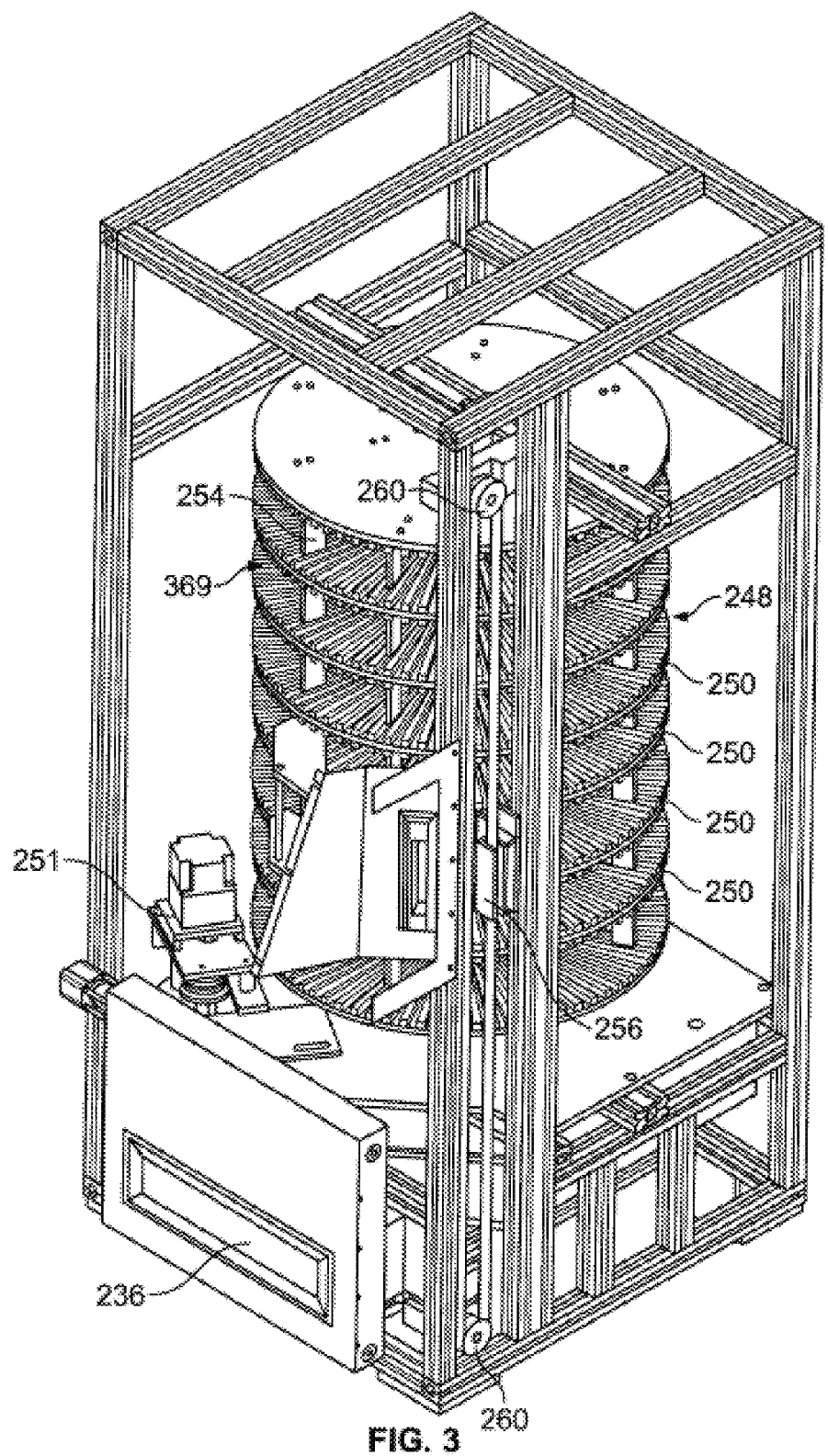
FIG. 3 is a partially open perspective view of the article dispensing machine of FIG. 2.

Referring now to FIG. 3 which shows the components positioned in the interior of dispensing machine 230, the article dispensing machine includes a non-removable storage unit 248 which may be a carousel-style, cylindrical storage facility having a plurality of compartmentalized rows 249 defined by circular-shaped storage racks 250 sharing a common central axis. Each of the rows 249 has a plurality of receiving slots or compartments 369. Each storage rack 250 includes radially extending, angularly separated compartment panels defining article storage compartments 369 which are designed to receive and retain flat-type pack articles, such as DVD, Blue-Ray disc, and video game disc cases, as desired. The compartment panels are preferably axially aligned to retain the opposing sides of DVD, Blu-ray disc, and video game disc cases at the top and bottom ends thereof. In that regard, the DVD, Blu-Ray disc, and video game disc cases are preferably retained between successive vertical pairs of storage racks 250. The storage racks 250 are vertically spaced by axially extending support members 254.

Figure 4:
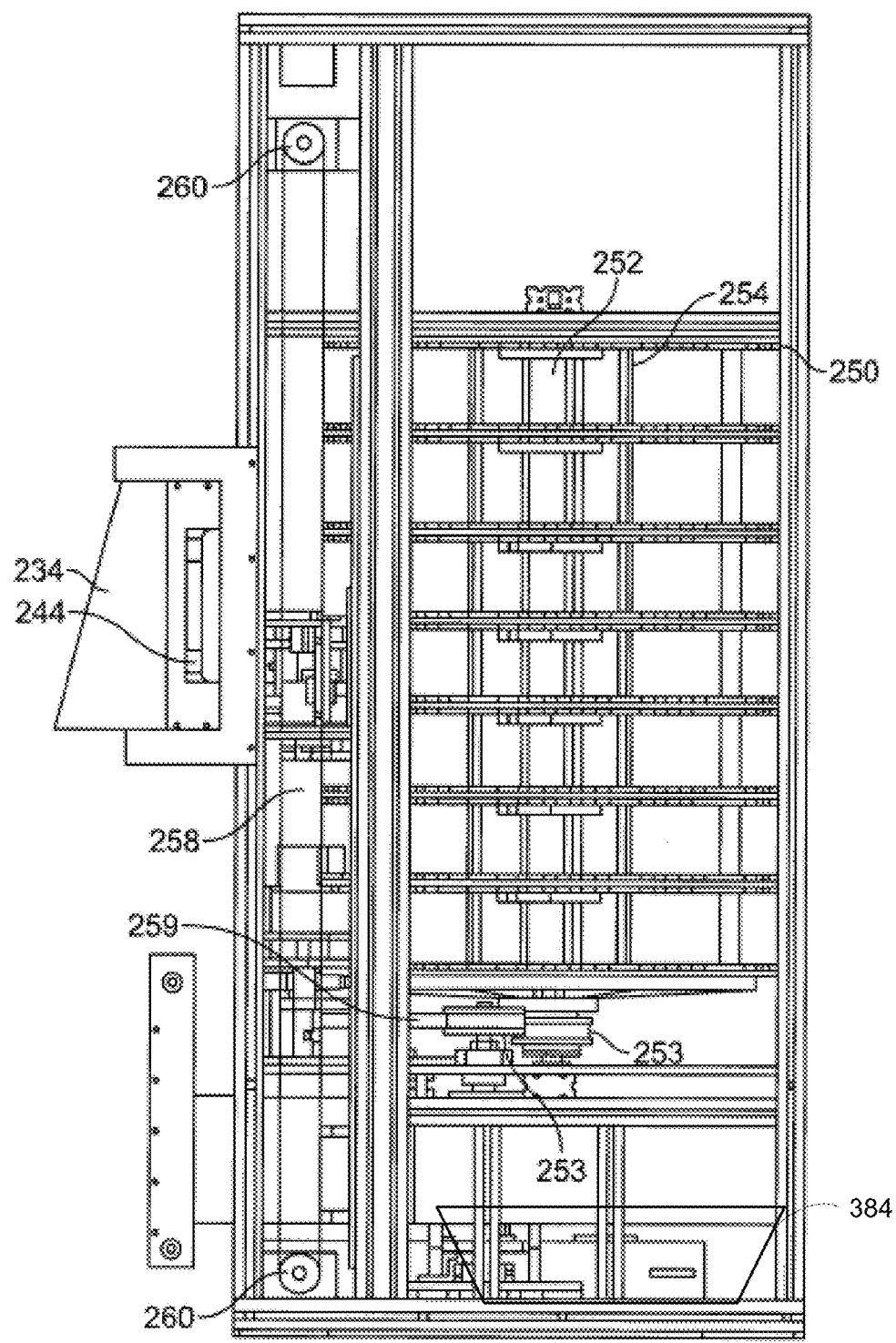
FIG. 4 is a partially open side elevational view of the article dispensing machine of FIG. 2.

A first motor 251, hereinafter referred to as the rotational motor, rotates the storage unit 248 about a vertical axis formed by the driven shaft 252. As shown in FIG. 4, rotational motor 251 drives a belt 259, which in turn rotates wheels 253 and shaft 252 to which the storage racks 250 are attached.

Figure 5:
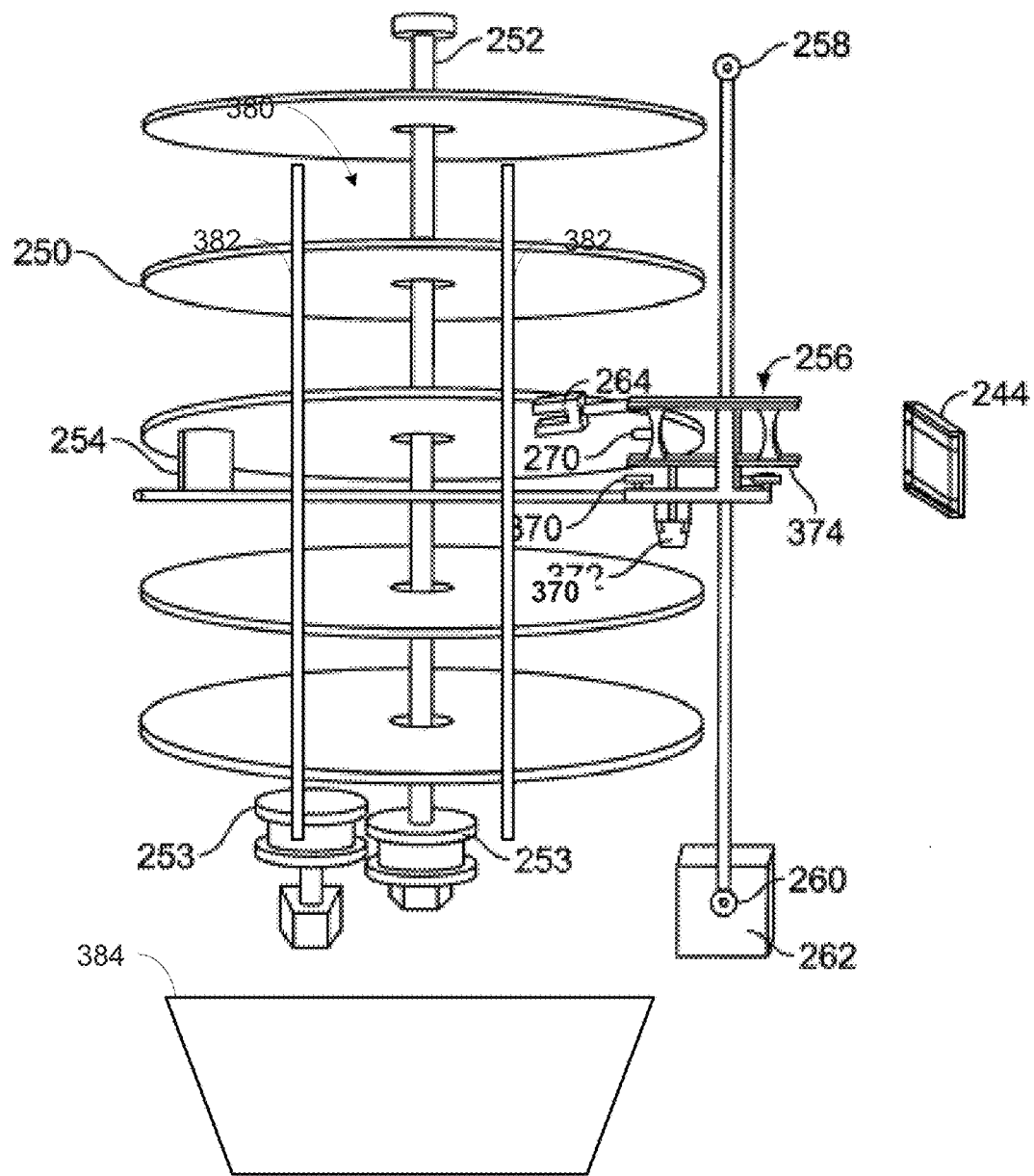
FIG. 5 is a partially open side elevational view of the view of the article dispensing machine of FIG. 2 with certain components removed for clarity.

As shown in FIGS. 3 and 5, a selector arm 256 is adjacent the storage unit 248. The selector arm 256 is connected to a conveying belt 258 carried by rollers 260, which are preferably positioned proximate to the top and the bottom of the article dispensing machine housing. At least one of the rollers 260 may be driven by a second motor 262, hereinafter referred to as the selector arm motor, to provide for vertical movement of selector arm 256 along a vertical axis generally parallel to the vertical axis of the storage unit 248. Alternatively, the selector arm motor 262 may be positioned on the selector arm 256. In a preferred embodiment, the motors 251, 262 are stepper motors that are capable of accurately controlling the movement and position of the compartmentalized storage unit 248 and the selector arm 256, respectively.

Referring now to FIG. 5, the article dispensing machine 230 is equipped with a first sensor 270 for sensing objects stored in the inventory of the apparatus. The first sensor is preferably mounted on the selector arm 256. A variety of forms of sensors are practicable with the invention set forth herein for use as the first sensor without departing from the principles thereof, including proximity sensors, an optical laser scanner, a magnetic scanner, an optical bar code reader, an ultraviolet optical scanner, a radio frequency sensor, and an infrared optical scanner. The article dispensing machine 230 is further equipped with a second sensor 370 capable of reading information attached to the objects stored in the inventory of the apparatus. The second sensor 370 is preferably, as illustrated, mounted on the selector arm 256. A variety of forms of sensors are practicable with the invention set forth herein for use as the second sensor without departing from the principles thereof, including an optical laser scanner, a magnetic scanner, an optical bar code reader, an ultraviolet optical scanner, a radio frequency sensor, and an infrared optical scanner.

The selector arm 256 comprises a picker device 264 which is capable of removing a DVD, Blu-Ray disc, or video game disc from the compartments 369. The selector arm 256 may further comprise a conveyor belt 374, which contacts one of the media products in one of the compartments 369 and conveys the product to the article transfer opening 244 whereby it is delivered to a user on the exterior of the article dispensing machine 230. The conveyor 374 is driven by a conveyor motor 372.

A system and method for calibrating the selector arm controller is disclosed in commonly owned U.S. Patent Application, Publication No. 2006/0254832, which is herein incorporated by reference in its entirety.

Generally, during the normal operation of the article dispensing machine, each article of inventory dispensed from a dispensing machine is preferably scanned by the second sensor 370 and an electronic record is created indicating the consumer who rented and/or purchased the media. In addition, articles of inventory returned to a dispensing machine by a customer and inserted into the article transfer opening 244 thereof are preferably scanned by the second sensor 370 and identified by the dispensing machine (for example with a bar code reader or scanner in electronic communication with the dispensing machine controller, positioned proximate the media dispensing/return opening) along with an identification of its later stored position on the storage unit 248.

These electronic records can be shared among dispensing machines within a network thereof, and can also be shared with a centralized office via the Internet or any other electronic data communication link. These electronic records can be used to ensure that the inventory process is carried out efficiently and accurately.

In one embodiment, a predetermined area in the storage unit 248 may be designated as a merchandising zone 380 for optimizing the utilization of inventory space of the article dispensing machine 230. For example, space within the article dispensing machine 230 that was previously empty, unused, or otherwise unavailable for storing articles of inventory may be optimally repurposed as part of the merchandising zone 380. In one embodiment, the articles stored in the merchandising zone 380 are designated as non-dispensable articles. For example, the merchandising zone 380 may be used to hold articles that have been targeted for removal from the article dispensing machine 230 prior to actual, physical removal of the articles. As a result, inventory space that had previously been used to store articles targeted for removal from the article dispensing machine 230 may now be used, thereby increasing the capacity for storing rentable and sellable media articles. In addition to, or instead of, articles targeted for removal, new articles may be loaded into the merchandising zone 380 and may be at least temporarily designated as non-dispensable articles, in accordance with certain agreements as discussed in more detail below.

A predetermined number of article storage compartments 369 in each of the storage racks 250 that make up the storage unit 248 may be part of the merchandising zone 380. In one embodiment, the merchandising zone 380 may consist of a quadrant of each of the storage racks 250. The merchandising zone 380 may be included as any portion or all of the storage unit 248 and/or as one or more storage racks 250. The number of compartments 369 included in the merchandising zone 380 may vary. In some embodiments, some or all of one or more of the storage racks 250 of the storage unit 248 may be designated as the merchandising zone 380. If the entirety of one or more storage racks 250 is designated as the merchandising zone 380, these designated storage rack(s) 250 may be located at an optimal height of the storage unit 248 to facilitate easier access for field service representatives. For example, the merchandising zone 380 may be the top-most storage rack 250, instead of a storage rack 250 located lower in the storage unit 248, so that the field service representative would not have to bend or crouch down to access the merchandising zone 380.

Color-coded rods 382, in one embodiment, may delineate the merchandising zone 380 so that inventory stocking personnel and/or field service representatives can quickly and easily identify the merchandising zone 380. Other locators and/or indicators may be utilized to identify and define the merchandising zone 380. For example, the location of the storage compartment 369 where the merchandising zone 380 begins may be stored by the article dispensing machine processor 300 or otherwise identified by the processor 300. Similarly, the location of the storage compartment 369 where the merchandising zone 380 ends may be stored or otherwise identified by the processor 300. In one embodiment, in addition to storing the starting and ending locations, the location of each storage compartment 369 that is included in the merchandising zone 380 can be stored or otherwise identified by the processor 300. The location of a storage compartment 269 may include, e.g., a vertical coordinate and a horizontal coordinate, as described in more detail below with respect to FIG. 6.

By storing the locations of the storage compartment 369 included in the merchandising zone 380, the processor 300 is able to guide the picker 264 and/or selector arm 256 to the correct compartments 369 during the various operations or jobs described herein. For example, during the inventory auditing process, described in more detail below with respect to FIG. 7, the processor 300 can direct the selector arm 256 to bypass the locations associated with the merchandising zone 380 during the normal inventory auditing process.

Additionally, the predetermined area in the storage unit 248 may include an article removal bin 384 that is located at the bottom of the article dispensing machine 230 for collecting media articles for removal. Media articles moved into the article removal bin 384 may include damaged articles, fraudulent articles, or do not rent (DNR) articles that are no longer eligible for rental or sale. In one embodiment, thinned articles may be moved into the article removal bin 384. Damaged articles, fraudulent articles, DNR articles, thinned articles, and other statuses of media articles are detailed below. The inventory stocking personnel or field service representatives may physically remove the media articles from the article removal bin 384 when inventory management of the article dispensing machine 230 is performed, as described below. In one embodiment, the article removal bin 384 may be an open bin into which articles being removed may be dropped. In other embodiments, the article removal bin 384 may include slots and/or compartments for holding the articles being removed. The article removal bin 384 may include an incline in the bottom of the bin to improve and optimize the loading of articles into the article removal bin 384. As shown in FIG. 5, the bin 384 may have sloped/angled sides to increase the surface area of the top opening of the bin 384. As will be appreciated, the bin 384 can have any shape or size that optimally utilizes the space under the storage racks 250 in accordance with the teachings herein.

The use of the article removal bin 384 and/or additional storage racks 250 in the storage unit 248 can significantly increase the inventory capacity of the article dispensing machine 230. For example, a previous version of an article dispensing machine may have had an inventory capacity of 710 media articles, of which 80 media articles are unavailable for rental or sale to a customer. Accordingly, in this previous machine 630, media articles would have been available for rental or sale to a customer. The invention set forth herein allows for installation and use of the article removal bin 384 and/or one or more additional storage racks 250 in place of the inventory space previously used for the 80 media articles that are unavailable for rental or sale.

In one embodiment, an additional storage rack 250 of the storage unit 248 may allow storage of 87 additional media articles that are available for rental or sale to a customer, and an article removal bin 384 may allow storage of 60-100 additional media articles that are not available for rental or sale to the customer. The overall inventory capacity of the article dispensing machine 230 in this embodiment may therefore be increased from 710 to 777-817 media articles, an increase of 9.4-15%. In this embodiment, the number of media articles available for rental or sale may be increased from 630 to 717 media articles, an increase of 13.8%.

In another embodiment, an article removal bin 384 may allow storage of up to 150 media articles that are not available for rental or sale to the customer. The overall inventory capacity of the article dispensing machine 230 in this embodiment may be increased from 710 to 780 media articles, an increase of nearly 9.9%, with the 150 additional media articles not being available for rental or sale.

The article dispensing machine 230 may include an automated self healer job that, when executed, optimizes and maximizes the availability of article inventory. For example, if an article has an unknown identity due to errors or other reasons, execution of the self healer job may help determine the identity of the unknown article. Unknown articles may initially be unidentifiable if the article dispending machine 230 is unable to capture identifier information on the article due to problems with the sensor 370, a missing identifier, a misaligned identifier, etc. These unknown articles may be placed in the article removal bin 384 and/or the merchandising zone 380 if, upon identifying the unknown articles, it is determined that the unknown articles are to be removed from the article dispensing machine 230 or are to be made unavailable for rental or sale.

The physical media article in an article dispensing machine 230 may include at least a DVD, Blu-Ray disc, video game disc, or other media article. Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. Communication with the central controller 302 may be interrupted if the load at the central controller 302 is above a certain threshold. For example, the central controller 302 may direct the article dispensing machine 230 to only transmit certain types of messages and/or transactions, e.g., financial authorizations, until the load has decreased. In these cases, transaction data can be stored locally in the article dispensing machine 230, such as in the article dispensing machine memory storage device 281, until a predetermined time interval elapses, when a predetermined number of transactions is reached, until communication with the central controller 302 can be reestablished, or the load at the central controller 302 has decreased. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302 and central database 304 for the media information. Once the media information is obtained, the article dispensing machine 230 may display that particular media article on the user interface 234 as in-stock and available for consumption.

In another embodiment, the article dispensing machine 230 can display media articles that are both physically located and not physically located at the article dispensing machine 230. In this embodiment, media articles which are both available and unavailable for consumption can be displayed. A media article may be unavailable for consumption if it is not in-stock, is in-stock but has been reserved for rental or purchase, or is otherwise unavailable for consumption (e.g., articles in the article removal bin 384 or the merchandising zone 380). In one example, the entire catalog of media articles stored in an inventory database can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-dispensed media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent or buy a media article that is out-of-stock, reserved for another customer, or otherwise cannot be dispensed at the particular article dispensing machine 230, then that media article can be deemed an unavailable media article.

A customer may rent and/or purchase one or more media articles from an article dispensing machine 230 during a transaction. Multiple copies of the same media article may be present in an article dispensing machine 230 so that the media article is available to multiple customers. For example, a new release of a DVD or Blu-Ray disc of a recent movie may have a higher demand than a DVD or Blu-Ray disc for an older movie. In this case, more copies of the new release may be stocked in the article dispensing machine 230 in anticipation of the higher demand.

The operator of the article dispensing machine 230 may have agreements with the producers, manufacturers, distributors, and/or developers of the media articles that dictate the manner, location, pricing, duration, disposal, and/or other parameters related to the rental and sale of the media articles. Some agreements may include a transaction eligibility cutoff date that specifies the last date that a media article may be rented or sold. For example, the operator may have an agreement with a movie studio that allows DVDs and Blu-Ray discs from that movie studio to be rented for a certain time period, after which the DVDs and Blu-Ray discs must be returned or destroyed. As another example, the operator may have an agreement with a video game developer that allows a certain number of video game discs from that developer to be stocked for rental or sale in an article dispensing machine 230 for a certain time period, after which a lower number of video game discs may be stocked. Some agreements may specify that the removal of media articles from article dispensing machines 230 at certain dates prior to the transaction eligibility cutoff date may result in reduced costs. Thus, the merchandising zone 380 and/or article removal bin 384 may be used to comply with an agreement that dictates the removal of media articles from the article dispensing machine 230, e.g., if media articles must be returned, destroyed, reduced, or otherwise removed.

Media articles may also be removed from the article dispensing machine 230 if the operator makes a business decision to reduce or eliminate the availability of a media article for rent or purchase, such as if a media article has rentals or sales that are below expectations, or if a media article is an older title. For example, analysis of sales and rental data stored in the database 304 may determine how long a media article has been stored in inventory. As another example, a profitability analysis of sales and rental data may determine which media articles are selling well and which are not. Other media articles may be removed from the article dispensing machine 230 if the media articles are damaged, fraudulent, or for other reasons. Thus, through use of the merchandising zone 380 and/or article removal bin 384, some or all of the media articles stored in the article dispensing machine 230 can be automatically sorted into one or more predetermined areas prior to any manual interaction with a field service representative.

Media articles that may be removed from an article dispensing machine 230 may fall into various categories, including thinned articles, damaged articles, fraudulent articles, rebalancing articles, and do not rent (DNR) articles. A particular media article may be designated as a thinned article if the operator of the article dispensing machine 230 wishes to reduce the stocked number of the particular media article, such as when the transaction eligibility cutoff date is upcoming or as a result of the operator's business decision, e.g., rentals or sales are below projections. A subset of thinned articles may be designated as rebalancing articles if the operator of the article dispensing machine 230 wishes to place particular media articles in another article dispensing machine 230. Accordingly, thinned articles may be removed from the article dispensing machine 230 prior to the expiration of the transaction eligibility cutoff date or other specified date and placed into the merchandising zone 380 and/or article removal bin 384.

If a particular media article becomes damaged or otherwise unplayable, the media article may be designated as a damaged article and may be removed from the article dispensing machine 230 so that a customer cannot rent or purchase it. Media articles that have been reported as being fraudulent can be designed as fraudulent articles that may also be removed from the article dispensing machine 230 so that a customer cannot rent or purchase it.

Furthermore, a particular media article may be designated as a do not rent (DNR) article if the transaction eligibility cutoff date for the particular media article has passed so that the particular media article is not eligible to be rented or sold. In some cases, an agreement may specify penalties if a DNR article is not removed from an article dispensing machine 230 by the cutoff date. The agreement or contract may specify that DNR articles must be destroyed or returned to a distributor, studio, etc. There may be one or more categories of DNR articles that specify the relative urgency of whether a particular media article needs to be removed from the article dispensing machine 230.

New media articles may also be loaded into the article dispensing machine 230 to replace the media articles which have been removed. The new media articles may include, for example, new releases of DVDs, Blu-Ray discs, and video game discs for rental or sale to customers. Media articles of previously released media content, such as older movies or video games, may also be loaded into the article dispensing machine as new media articles. One or more copies of a particular media article may be loaded as new media articles. Inventory space for these new media articles that can be rented or sold to customers may be increased by moving media articles to the merchandising zone 380 and/or article removal bin 384, which ultimately will be physically removed from the article dispensing machine 230. In one embodiment, new media articles may be loaded into the article dispensing machine 230 prior to, for example, the previously agreed-upon release date for the new article, as described above. To ensure compliance with any applicable agreements, the new articles may be placed in the merchandising zone 380 and may be, at least temporarily, designated as non-dispensable articles (e.g., articles that are not available for consumption).

In one embodiment, a list that identifies a subset of media articles targeted for removal may be received at an article dispensing machine 230. The list may also include the location (e.g., vertical and horizontal coordinates) at which the media articles are stored in the article dispensing machine 230. The list may identify thinned articles (including rebalancing articles), damaged articles, fraudulent articles, and/or DNR articles that are specified by the operator of the article dispensing machine 230. As described above, these media articles may be targeted for removal based on agreements and/or business decisions related to the reduction of stock for the particular media articles. The list of the subset of media articles may be in an XML format or other appropriate format. The article dispensing machine 230 may receive the list from the central controller 302. The subset of media articles may have been manually or automatically selected for the list based on analysis of sales and rental data, for example. The subset of media articles identified in the list may be moved from the storage unit 248 to the merchandising zone 380 and/or the article removal bin 384, depending on various factors. These factors may include how the media articles have been designated, the available space in the merchandising zone 380, and the available space in the article removal bin 384. The articles identified by the above-described list may also be designated as non-dispensable articles.

Media articles may be moved to the merchandising zone 380 from other areas of the storage unit 248. In one embodiment, thinned articles (including rebalancing articles) may be moved to the merchandising zone 380. In another embodiment, any media article targeted for removal, including thinned articles, damaged articles, fraudulent articles, and/or DNR articles may be moved from the other areas of the storage unit 248 to the merchandising zone 380. The picker device 264 may move a media article from a compartment 369 in a non-merchandising zone area of the storage unit 248 to a compartment 369 in the merchandising zone 380. In one embodiment, media articles that are placed in the merchandising zone 380 may be placed from top to bottom and left to right, starting with a first storage rack 250. The media articles being moved may be selected based on the list of the subset of media articles received by the article dispensing machine 230. The moving of thinned articles and/or other media articles may be known as a thin job that can be executed on a periodic basis. For example, the thin job may be executed on a daily basis following a scheduled reboot of the article dispensing machine 230.

A message may be transmitted to the central controller 302 indicating that a thin job has been either successfully executed or did not successfully execute. A thin job may not successfully execute due to an error code or if the article dispensing machine 230 is loaded with new media articles before the thin job has completed. In this case, the media articles that did not get moved to the merchandising zone 380 by the initial thin job may be moved to the merchandising zone 380 by a later-executed thin job. If a media article that is targeted for removal is not present in the article dispensing machine 230 when the thin job is executed, but is later returned by a customer, that media article may be placed in a non-merchandising zone area of the storage unit 248 upon return. The media article may then be moved to the merchandising zone 380 when the next thin job is executed. Furthermore, thinned and other media articles in the merchandising zone 380 may be rented or purchased by a customer from the article dispensing machine 230.

After successful execution of a thin job, media articles may be moved to the article removal bin 384 from the storage unit 248. In one embodiment, DNR articles, damaged articles, and/or fraudulent articles may be moved from a non-merchandising zone portion of the storage unit 248 to the article removal bin 384. In another embodiment, thinned articles may be moved from a non-merchandising zone portion of the storage unit 248 to the article removal bin 384. In a further embodiment, media articles that had previously been moved to the merchandising zone 380 may be moved from the merchandising zone 380 to the article removal bin 384. The media articles placed in the article removal bin 384 may be based on the list of the subset of media articles received by the article dispensing machine 230.

The picker device 264 may move a media article from a storage compartment 369 in the storage unit 248 to the article removal bin 384. The moving of media articles may be known as a load bin job that can be executed on a periodic basis. For example, the load bin job may be executed on a daily basis following execution of the thin job. A maximum number of media articles that are allowed to be moved into the article removal bin 384 may be defined. Accordingly, the number of media articles loaded into the article removal bin 384 may be tracked so that the article removal bin 384 is not overloaded.

Upon successful execution of load bin job, media articles moved into the article removal bin 384 may be marked in a database with an in-bin status. The database may include an inventory database within the article dispensing machine database 282, central database 304, or other database. Marking the status of the articles in the database assists in keeping track of the location of each piece of inventory. Each article may have a unique identifier, such as a barcode, serial number, radio frequency identification (RFID) tag, or other identifier, that identifies characteristics of the article, such as a title of article, type of article, status of article, and other information. When the media articles are moved into the article removal bin 384, their unique identifiers may have been read by the sensor 370, for example.

As discussed above, media articles may be categorized with a variety of statuses, including in-bin, thinned, damaged, fraudulent, DNR, and unknown. Media articles may also be categorized with other statuses, whether they are physically located in the article dispensing machine 230 or located elsewhere. These other statuses include dispensable, non-dispensable, in-kiosk, removed, missing, rented, wrong title, received, sold, and destroyed. The in-kiosk and removed statuses are discussed further below.

A dispensable article is an article designated as being available for consumption (e.g., rental or sale). Typically, a dispensable article is not stored in the merchandising zone 380 or the article removal bin 384. In one embodiment, dispensable articles are capable of being audited during the inventory auditing process described below. A non-dispensable article is an article designated as not being available for consumption. Typically, a non-dispensable article is stored in the merchandising zone 380 or the article removal bin 384. In one embodiment, non-dispensable articles are not audited during the inventory auditing process described below.

A media article designated as a missing article is a particular media article that was expected to be in one location or slot in the storage unit 248 but is not actually located there. The location or slot in the storage unit 248, in this case, may be empty or contain another media article. A rented article is a media article that has been rented to a customer. A media article that is designated as a wrong title article is a particular media article that has been reported to have the wrong title associated with it in the inventory database. Wrong title articles in the article dispensing machine 230, if present, may also be targeted for removal. A received article is a media article that has been reported as being received by the warehouse or distribution center following removal from the article dispensing machine 230. A sold article is a media article that has been sold out of the inventory of the article dispensing machine 230. A media article designated as a destroyed article is a particular media article that has been destroyed, including those destroyed pursuant to an agreement.

The article dispensing machine 230 may receive a command for initiating inventory management of the article dispensing machine 230. In one embodiment, inventory management may be initiated by a field service representative who logs into the article dispensing machine 230 using the user interface 234 for the purpose of removal and loading of media articles. During inventory management, the user interface 234 may display instructions, graphics, and/or other information to assist the field service representative in the removal and loading of media articles from the article dispensing machine 230. For example, the user interface 234 may display and/or indicate a particular storage rack 250 and/or compartment 369 corresponding to a media article that is to be removed or where a media article is to be loaded.

In order to perform inventory management, the article dispensing machine 230 determines whether any media articles have been moved into the article removal bin 384. Thinned articles, DNR articles, damaged articles, and/or fraudulent articles may have been placed in the article removal bin 384, as described above. If no media articles have been moved into the article removal bin 384, the article dispensing machine 230 awaits receipt of confirmation that there are no media articles in the article removal bin 384. The field service representative may interact with the user interface 234 to confirm that there are no media articles in the article removal bin 384. However, if media articles have been moved into the article removal bin 384, then the article dispensing machine 230 awaits receipt of confirmation that the media articles have been removed from the article removal bin 384. The field service representative may remove the media articles from the article removal bin 384 then interact with the user interface 234 to confirm that the media articles have been removed from the article removal bin 384.

Next, or in certain embodiments, without having previously performed the above-described steps, the article dispensing machine 230 determines whether media articles have been moved into the merchandising zone 380. Thinned articles and/or other articles targeted for removal may have been moved into the merchandising zone 380 from other areas of the storage unit 248 as described above. If media articles have been moved into the merchandising zone 380, then the starting and/or ending locations of the thinned and other media articles in the merchandising zone 380 may be indicated on the user interface 234 so that the field service representative is informed of which media articles to remove from the article dispensing machine 230. Other visual, audio, and/or tactile indicators may be used to inform the field service representative of the locations of the media articles to be removed. In one embodiment, the picker device 264 may remove some of the initial media articles from the merchandising zone 380 so that the field service representative knows the beginning portion of which media articles to remove. The remainder of the media articles may subsequently be removed from the merchandising zone 380 by the field service representative. In some embodiments, there may be media articles targeted for removal that are stored outside of the merchandising zone 380 because the merchandising zone 380 is full. In this case, the article dispensing machine 230 may automatically dispense these media articles through the article transfer opening 244. In other embodiments, the motors 251 and 262 may be turned off so that the field service representative may manually and freely rotate the storage unit 248 to access the merchandising zone 380.

The article dispensing machine 230 awaits receipt of confirmation that the media articles in the merchandising zone 380 have been removed. In one embodiment, the field service representative may interact with the user interface 234 to confirm that the media articles have been removed from the merchandising zone 380. In another embodiment, the article dispensing machine 230 may automatically determine whether the media articles have been removed from the merchandising zone 380 by using the sensor 270, for example. Once the media articles have been removed from the merchandising zone 380, new media articles may be loaded into the merchandising zone 380 by the field service representative. The starting and/or ending locations for where to load the new media articles may be indicated on the user interface 234. Other visual, audio, and/or tactile indicators may be used to inform the field service representative of the locations where to load the new media articles. In one embodiment, new media articles may be loaded into the merchandising zone 380 from bottom to top and right to left, starting with a last storage rack 250. New media articles may include multiple copies of new releases and/or other media articles that will be available for rental or purchase by customers.

It is possible that there may be more new media articles to load into the merchandising zone 380 than available slots in the merchandising zone 380. In this case, the field service representative may enter a maintenance mode of the article dispensing machine 230. In one embodiment, the remaining new media articles that need to be loaded into the article dispensing machine 230 may be individually loaded through the article transfer opening 244 so that these media articles can be stored in other portions of the storage unit 248. In another embodiment, another thin job may be manually executed to remove further media articles from the inventory of the article dispensing machine 230 to make room for the new media articles.

After the new media articles are loaded into the merchandising zone 380, the article dispensing machine 230 awaits receipt of confirmation that the new media articles have been loaded. In one embodiment, the field service representative may interact with the user interface 234 to confirm that the new media articles have been loaded into the merchandising zone 380. In another embodiment, the dispensing machine 230 may automatically determine whether the new media articles have been loaded into the merchandising zone 380 by using the sensor 270, for example. The new media articles that have been loaded may be marked in a database with an in-kiosk status. The database may include an inventory database within the article dispensing machine database 282, central database 304, or other database.

After being loaded into the article dispensing machine 230, the new media articles may be moved from the merchandising zone 380 to other areas of the storage unit 248. The moving of new media articles may be known as a merchandising zone synchronization job. In one embodiment, the field service representative may initiate or schedule the merchandising zone synchronization job. In another embodiment, the merchandising zone synchronization job may be remotely initiated from the central controller 302. In another embodiment, the motors 251 and 262 may be activated so that the merchandising zone synchronization job can be executed, if the motors 251 and 262 had been turned off during loading/removal of media articles by the field service representative. In certain circumstances, new media articles may be rented or purchased by customers when the new media articles are in the merchandising zone 380, prior to or during execution of the merchandising zone synchronization job. A customer may also rent or purchase the new media articles after execution of the merchandising zone synchronization job when the new media articles have been moved to the non-merchandising zone area of the storage unit 248.

In some embodiments, the merchandising zone synchronization job may move some or all of the new media articles to optimized receiving slots 369 and/or optimized storage racks 250 that are nearest to the location of the picker device 264. In this way, the picker device 264 may have not have to travel as far to access a particular new media article when a customer rents or buys that new media article. The new media articles may include new releases or other titles with rental or sales volumes that are anticipated to be higher than for other media articles, for example. There may be less wear and tear on the picker device 264 and associated machinery because the picker device 264 would not have to travel as far to access these more popular media articles. In addition, a customer transaction may be completed more quickly. For example, the picker device 264 may typically be located near the article transfer opening 244, particularly following a customer transaction. In this case, placing new media articles that are likely to be rented or bought in the optimized receiving slots 369 and/or the optimized storage racks 250 that are nearest to the location of the picker device 264 will speed customer transactions involving these media articles.

Upon successful completion of the merchandising zone synchronization job, the thinned articles and/or other media articles that had been removed from the merchandising zone 380 may be marked in a database with a removed status. In some embodiments, the thinned articles and/or other media articles may be marked with a removed status when the field service representative has confirmed the removal of the thinned articles from the merchandising zone 380. A media article with a removed status has been physically removed from the article dispensing machine 230. An inventory report may be transmitted from the article dispensing machine 230 to the central controller 302 after a successful execution of the merchandising zone synchronization job.

In one embodiment, a merchandising zone unload job may be executed on a periodic basis to unload thinned and/or other media articles from the merchandising zone 380. The merchandising zone unload job may be executed in parallel with a thin job so that after a media article is moved from the merchandising zone 380 to a non-merchandising zone of the storage unit 248, another media article may be moved into the merchandising zone 380 to replace the previously moved media article. Some or all of the merchandising zone 380 may be reserved for thinned or non-removed articles unless that space is needed for other purposes.

The thin job, load bin job, merchandising zone synchronization job, merchandising zone unload job, self healer job, and other jobs that are periodically and/or automatically executed by the article dispensing machine 230 may each have a priority assigned to them. The priority may determine whether or not the job is executed at a scheduled time, based on whether the article dispensing machine 230 is performing other tasks. For example, if a customer is involved in a transaction at the article dispensing machine 230 at the time when a thin job is scheduled to be executed, the transaction can be allowed to continue and the thin job will execute after the transaction is completed. Jobs may also be interruptible and resumable so that other jobs or actions with higher priorities may be executed. In this way, jobs with longer durations may be interrupted and/or not started to allow higher priority jobs with shorter durations to execute, such as rental or return transactions involving a customer.

If any of a thin job, a load bin job, a merchandising zone synchronization job, or other jobs cannot be successfully executed, for example, because an error code is detected due to a mechanical or software issue, then the article dispensing machine 230 may enter a maintenance mode. In such a case, the article dispensing machine 230 may remain in the maintenance mode and not allow any customer transactions until serviced by a field service representative.

A previous version of an article dispensing machine 230 may be retrofitted to incorporate a merchandising zone 380 and/or an article removal bin. For example, the retrofitting may be carried out by installing one or more additional storage racks 250 to the storage unit 248 to increase the overall inventory capacity of the article dispensing machine 230. Alternatively, or additionally, the retrofitting may be carried out by installing the article removal bin 384 in the bottom portion of the article dispensing machine 230, as shown in FIG. 4, so that the selector arm 256 and the picker device 264 may deposit media articles targeted for removal in the article removal bin 384.

To complete the retrofitting, any existing apparatus and/or mechanisms in the article dispensing machine 230 may be removed or cleared from the area(s) where the article removal bin 384 and/or the additional storage rack 250 are to be installed. For example, obsolete or unused storage apparatuses, wiring, and/or other mechanisms may be removed or cleared from the bottom interior of the article dispensing machine 230. The existing apparatus and/or mechanisms may also be secured so that they do not interfere with installation of the article removal bin 384 and/or additional storage rack 250, e.g., bundling wires together and securing the bundle to a rail. An additional storage rack 250 and/or article removal bin 384 may not be installed if there is insufficient space in the article dispensing machine 230 or if a business decision has been made to not install an additional storage rack 250, for example.

In one embodiment, the additional storage rack(s) 250 installed according to retrofitting needs may be substantially similar to an existing storage rack 250 in the storage unit 248, and may be connected to the driven shaft 252 so that the entire storage unit 248 rotates together. In another embodiment, the additional storage rack(s) 250 and the existing storage racks 250 may rotate independently of one another. The additional storage rack(s) 250 (not shown) may be installed at the top or the bottom of the exiting storage racks 250, for example. Indicators identifying the merchandising zone 380 may be installed on some or all of the storage racks 250, including the newly-installed additional storage rack(s) 250. The indicators may include color-coded rods 382, for example, as shown in FIG. 5. The indicators may delineate the merchandising zone 380 so that inventory stocking personnel and/or field service representatives can quickly and easily identify the merchandising zone 380.

An article removal bin 384 installed according to retrofitting needs may be placed in the bottom interior of the article dispensing machine 230 and may be secured to the article dispensing machine 230 so that it is stationary but removable. More than one article removal bin 384 may be installed so that media articles in different categories can be segregated, for example. The software and/or firmware of the article dispensing machine 230 may be updated so that the newly-installed article removal bin(s) 384 and/or additional storage rack(s) 250 may be utilized as additional inventory capacity. The update software and/or firmware may enable the selector arm 256 and the picker device 264 to deposit media articles targeted for removal in the article removal bin 384 and merchandising zone 380, for example.

Figure 6:
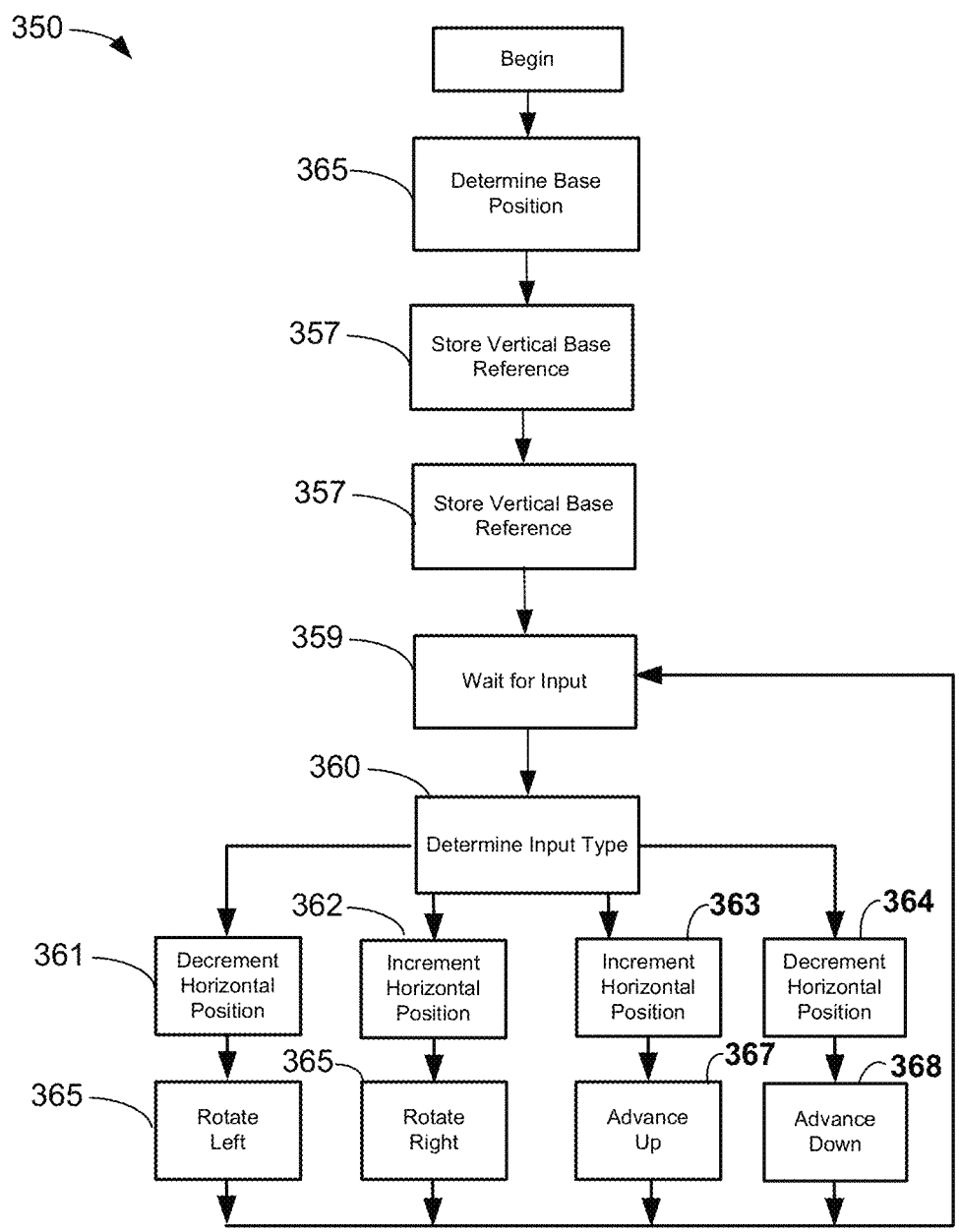
FIG. 6 is a flowchart illustrating an order of operations performed by an article dispensing machine for aligning a selector arm with an article.

FIG. 6 shows a process 350 for positioning the selector arm 256 in front of a storage compartment 369. In one embodiment, the vending controller 300 analyzes a new pair of coordinates associated with a media article stored within one of the storage compartments 369, such as, e.g., the media article stored next to a present position of the selector arm 256. The coordinates comprise a vertical coordinate and a horizontal coordinate (or a vertical coordinate and an angular coordinate), wherein the vertical coordinate refers to one of the plurality of rows 249 and the horizontal component refers to one of the compartments 369 within that row 249. At step 356, the vending controller 300 determines a first base position corresponding to the present position of the selector arm 256, and based thereon, a vertical base reference 357 and a horizontal base reference 358 are stored. The controller 300 then waits for an input as shown in step 359. For example, the input may be the new pair of coordinates associated with the media article stored next to the present position of the sector arm 256. The controller 300 analyzes the vertical coordinate of the new coordinate pair and the vertical coordinate of the present position to determine whether to advance the selector arm 256 up or down along the vertical axis to reach the new vertical coordinate. If the new vertical coordinate is greater than the present vertical base reference position of the selector arm 256, as determined in step 367, the controller 300 instructs the motor 262 to advance the selector arm 256 in an "up" direction along the vertical axis, as illustrated in step 363. If the new vertical coordinate is less than the present vertical base reference position of the selector arm 256, as determined in step 368, the controller 300 instructs the motor 262 to advance the selector arm 256 in a "down" direction along the vertical axis, as illustrated in step 364. If the new vertical coordinate is the same as the present vertical base reference position, no action is taken. Thus, the selector arm 256 is positioned at the new vertical coordinate received from the controller 300 wherein the new vertical coordinate refers to one of the plurality of compartmentalized rows 249.

The controller 300 also analyzes the horizontal coordinate of the new coordinate pair, wherein the horizontal coordinate refers to one of the storage compartments 369 in one of the rows 249. If the new horizontal coordinate is greater than the present horizontal base reference position of the selector arm 256, as determined in step 366, the controller 300 instructs the motor 251 to rotate the storage unit 248 in a clockwise direction, as illustrated in step 362. If, however, the new horizontal coordinate is less than the present horizontal base reference position of the selector arm 256, as determined in step 365, the controller 300 instructs the motor 251 to rotate the storage unit 248 in a counterclockwise direction, as illustrated in step 361. If, however, the new horizontal coordinate is equal to the present horizontal base reference position, the storage unit 248 is not rotated. Thus, after the rotation is complete, the selector arm 256 will be aligned with the storage compartment 369 corresponding to the new coordinate pair.

It will be understood that a motor 251 capable of rotating in a single direction (i.e., clockwise or counter-clockwise) is practicable with the invention set forth herein, because the storage unit 248 is cylindrical. In particular, if the horizontal coordinate of the coordinate pair is less than the present horizontal base reference position of the selector arm 256, the controller 300 can instruct the motor 251 to rotate the storage unit 248 clockwise until the selector arm 256 is aligned with the correct compartment 369. Thus, either a unidirectional or bidirectional motor 251 can be used to rotate the storage unit 248.

Figure 7:
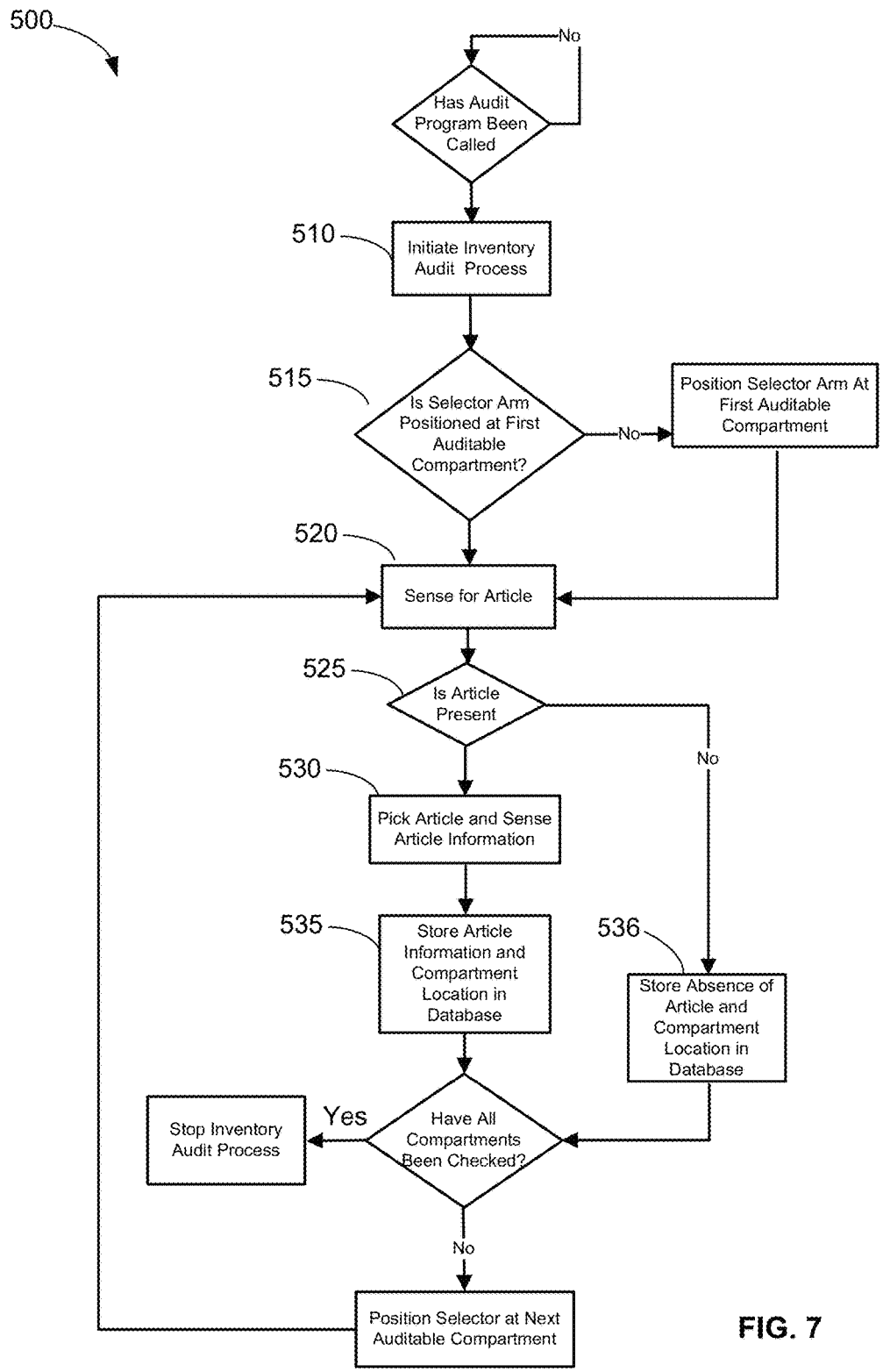
FIG. 7 is a flowchart illustrating an order of operations performed by an article dispensing machine for auditing the inventory of the article dispensing machine.

An inventory auditing process 500 is shown in FIG. 7. Initiation 510 of the inventory auditing process 500 may be triggered automatically based on a number of conditions. For example, a separate scheduling program may call the inventory auditing program at a certain time each day or at a certain time and day of each week. Alternatively, a separate program may call the inventory auditing program after a certain number of service hours have passed or after a certain number of transactions have occurred. In addition, the inventory auditing process 500 could be initiated by a number of conditions. For example, the program may be automatically initiated a specified amount of time after a system restart or a set amount of time after a power loss and subsequent power restoration by a restart program. Initiation may also be set to occur automatically after restocking of the machine by a restocking program or by a field service representative after loading and/or removal of articles. Furthermore, initiation may occur manually, for example, by a request from an administrator or a request from a central processor to which the article dispensing machine 230 is networked.

The inventory auditing process 500 is controlled by an inventory auditing computer program and, thus, initiation of the inventory auditing process 500 comprises the article dispensing machine processor 300 beginning the inventory auditing computer program which may be stored in the article dispensing machine memory 281. The inventory auditing computer program may be run as a background program or may be run on a partitioned operating system, thereby permitting a customer to interact with the machine operating system and allowing the article dispensing machine processor 300 to perform various routines while the article dispensing machine processor 300 runs the inventory auditing program.

As shown in step 515, the inventory auditing program determines whether selector arm 256 is positioned at a designated first compartment based on the coordinates of the selector arm. If the selector arm is at the first compartment, no action is taken. However, if the selector arm is not at the first compartment, the inventory auditing program directs the processor to generate signals to rotational motor 251, which drives the rotation of the storage unit 248, and selector arm motor 262, which adjusts the vertical position of the selector arm 256, to position the selector arm 256 relative to the first storage compartment.

As shown in step 520, after the selector arm 256 is positioned adjacent the storage compartment 369, the code, via the processor 300, generates a signal to the first sensor 270, which is preferably located on the selector arm 256, instructing the first sensor to sense for the presence or absence of an article in the storage compartment 369. The first sensor 220 returns a signal to the processor 300 indicating whether or not an article is present in the storage compartment 369. If the first sensor 270 detects the presence of an article and the processor 300 receives such a signal, inventory auditing program instructs the processor 300 to generate a signal for the picker 264 to remove the article from the compartment 369, as shown in steps 525 and 530. The program code, as executed by the processor 300, instructs the picker 264 to align the article with the second sensor 370, which may be an optical camera or other sensor capable of reading a bar-code or other information located on the article. A third sensor or set of sensors 375, in communication with the processor 300, may be used to position the article in front of the second sensor 370. The information on the article may include the type of article (e.g., DVD, Blu-Ray disc, video game, etc.), a status of the article (e.g., in-kiosk, DNR, damaged, etc.), and/or a unique identifier for the article. In one embodiment, the information is contained in a code, such as a bar code, and is read by the second sensor 370 and transferred to the processor 300, which stores the information in a database 282 stored in the article dispensing machine memory 281. After the processor 300 has received the information from the second sensor 370, the inventory auditing program instructs the controller to generate signals to the picker 264 to cause the picker 264 to return the article to the storage compartment 369.

The location of the compartment/article is determined based on the positional information of the motors 262 and 251, which control the position of the selector arm 256 and the storage unit 248, respectively. As described above in greater detail, motors 251, 262 are preferably stepper motors that are capable of accurately controlling the movement and position of the compartmentalized storage unit 248 and the selector arm 256, respectively. Thus, the actuation of motor 251 or 262 by processor 300 may be correlated to the position of the storage compartment 369 within the storage unit 248 and recorded as a set of coordinates. In this manner, the position of the storage compartment 369 may be determined and the position of the article may also be transferred to the article dispensing machine database 282 along with information read from the article as shown in step 535.

If the first sensor 270 detects that no article is present in a storage compartment 369, the first sensor generates a signal to the processor 300 indicating that no article is present. The inventory auditing program then instructs the processor 300 to store the absence of the article along with the location of the storage compartment 369 in the article dispensing machine database 282, as shown in step 536. Alternatively, the inventory auditing program may instruct the processor 300 to compare the information read from the article and the location of the storage compartment 369 to the values that were already stored in the article dispensing machine database 282, thereby verifying the accuracy of the article dispensing machine database 282.

After the information is read from the article located in the storage compartment 369 or the lack of article in the storage compartment 369 is detected and the position of the storage compartment 369 is stored in the article dispensing machine database 282, the inventory auditing program sends a signal to actuate the rotational motor 251 to align the selector arm 256 with the next horizontally adjacent compartment 369. For example, the rotational motor 251 rotates the storage unit 248 so that the selector arm 256 is aligned with the compartment adjacent to the compartment that was most recently audited. The inventory auditing program then returns to step 520 and instructs the first sensor 270 to detect the presence of an article. If an article is present, the picker 264 is instructed to pick the article and the information read from the article is stored.

The above-described process may be repeated until each compartment 369 in the row is checked, at which point, the program instructs the selector arm motor 262 to raise or lower the selector arm 256 to begin sensing the compartments 369 in a vertically adjacent row of storage compartments 369. The program then continues to repeat the article detection, picking, and reading steps until all compartments 369 have been checked or until the process has been stopped in another manner.

In an alternative embodiment, instead of incrementally advancing the storage unit 248 from one compartment 369 to the next adjacent compartment 369, the program may send a signal to actuate the rotational motor 251 at a constant speed such that it steadily turns the storage unit 248. In this configuration, the inventory auditing program directs the first sensor 270 to continuously sense for the presence of an article. When the first sensor 270 detects the presence of an article in a storage compartment 369, it transmits this signal to the processor 300, which instructs the rotational motor 251 to stop the rotation of the storage unit 248 to allow the picker 264 to remove the article from the storage compartment 369.

If the article dispensing machine 230 includes a merchandising zone 380 within the storage unit 248, the inventory auditing program may be configured to bypass, or not audit, the storage compartments 369 included in the merchandising zone 380 during the inventory auditing process 500. In one embodiment, the storage compartments 369 are categorized as "auditable" or "non-auditable" storage compartments. For example, non-auditable storage compartments may be those compartments that are designated as part of the merchandising zone 380, and therefore, may not be audited by the inventory auditing program. And auditable storage compartments may be those storage compartments that are not designated as part of the merchandising zone 380, and therefore, may be audited by the inventory auditing program.

In some embodiments, the starting and/or ending locations of the merchandising zone 380 and/or the locations of each of the media articles stored in the merchandising zone 380 may be predetermined values that are stored prior to the inventory auditing process and retrieved by the processor 300 as a preset list. The preset list may be used by the processor 300 during the inventory auditing process to determine which locations to audit and which locations to bypass. In one embodiment, the preset list is stored remotely and retrieved by the article dispensing machine 230 during the inventory auditing process. In another embodiment, the preset list is stored in, for example, a memory of the article dispensing machine 230.

In some embodiments, the preset list may be generated, at least in part, based on the above-described list of non-dispensable articles, e.g., media articles that are targeted for removal. For example, the preset list may identify storage compartments 369 that are assigned to store non-dispensable articles, and are thus categorized as non-auditable compartments.

In one embodiment, the preset list may include the coordinates of each non-auditable storage compartment. During the inventory auditing process, the processor 300 may use the preset list to determine the categorization of the storage compartment 369 at which the selector arm 256 is currently located. For example, the processor 300 may determine a set of coordinates for the current storage compartment 369. The processor 300 may compare this set of coordinates to the preset list to determine whether the current location is included in the list of non-auditable storage compartments. If the current storage compartment is designated as a non-auditable storage compartment, then the processor 300 may direct the selector arm 256 to move to the next compartment, where the above-described process may be repeated.

In some embodiments, the preset list may identify the starting and ending locations of the merchandising zone 380, e.g., the non-auditable zone. For example, for each storage rack 250, there may be a starting and end location corresponding to the portion of the merchandising zone 380 that falls within that storage rack 250. These starting and ending locations may be used by the processor 300 to determine which portions of the storage racks 250 to bypass during the inventory auditing process. In one embodiment, the preset list may include the coordinates corresponding to the starting and ending locations of the merchandising zone 380.

In some embodiments, the starting and ending locations of the merchandizing zone 380 may be detected by a sensor upon detection of the color-coded rods 382. For example, one color-coded rod 382 may designate the starting location of the merchandizing zone 380 (e.g., a starting rod), and a second color-coded rod 382 may designate the ending location of the merchandizing zone 380 (e.g., ending rod). Upon detection of the starting rod, the inventory auditing program may direct the selector arm 256 to keep moving, for example, around the instant storage rack 250, until the ending rod is detected. As such, the inventory auditing program may bypass auditing of those articles stored between the starting rod and the ending rod, thus bypassing the merchandizing zone 380. Upon detection of the ending rod, the inventory auditing program may direct the selector arm 256 to resume the inventory auditing process, for example, by checking the next storage compartment in the instant storage rack 250 for the presence or absence of an article. In another embodiment, detection of the starting and/or ending locations of the merchandizing zone 380 may be triggered by other types of markers (e.g., non-auditable markers) that are placed in each storage rack 250 to designate the starting and ending locations of the merchandizing zone 380 and/or in each storage compartment that is associated with the merchandizing zone 380. For example, the markers may be tabs (e.g., protrusions attached to the storage racks 250), LEDs, magnets, bar codes, RFIDs, and/or other types of devices that are capable of being detected by a sensor.

In one embodiment, the first sensor 270 may detect the presence of a rod 382 or other marker in the same way that the first sensor 270 detects the presence of an article (e.g., based on proximity sensing, using infrared technology, scanning with an optical laser etc.) In another embodiment, the article dispensing machine 230 may include a mark sensor (not shown) that is used to detect the presence of color-coded rods 382 or other markers during an inventory auditing process. The mark sensor may be any type of sensor capable of detecting the presence of a rod 382 or other marker, including, but not limited to, a proximity sensor, an infrared sensor, an optical laser scanner, a magnetic scanner, an optical bar code reader, an ultraviolet optical scanner, or a radio frequency sensor.

Referring back to FIG. 6, in order to position the selector arm 256 in front of a particular storage compartment, such as, for example, the storage compartment adjacent to the most recently audited compartment, the processor 300 may receive coordinates associated with the media article stored in the adjacent storage compartment 369 and may analyze the new coordinates to determine whether the selector arm 256 should be moved up, down, left, and/or right in order to arrive at the adjacent storage compartment. In one embodiment, while analyzing the new pair of coordinates, the processor 300 may compare the new coordinates to the coordinates associated with predetermined non-auditable storage compartments. If the processor 300 determines that the new pair of coordinates corresponds to a non-auditable compartment 369, the processor 300 may request the coordinates of the storage compartment that comes after the non-auditable compartment and analyzes these new coordinates in a similar manner. The processor 300 may continue this process until an auditable storage compartment 369 is identified, at which point the processor 300 analyzes the auditable coordinates to provide positional directions to the selector arm 256.

If an entire storage rack 250 is designated as being non-auditable, e.g., part of the merchandising zone 380 and/or holding a non-dispensable article, the processor 300 may direct the selector arm 256 to move to the next auditable storage rack 250 for continuing the auditing process. Similarly, if an entire quadrant of a storage rack 250 is designated as non-auditable, then the processor 300 may direct the selector arm 256 to bypass the entire non-auditable quadrant and move to the next auditable storage compartment 369. In one embodiment, one or more of the storage compartments designated as part of the merchandising zone 380 may be designated as being auditable, at least temporarily, for example, if there is no room in the non-merchandising area for storing dispensable articles. As a result, in some instances, at least a portion of the merchandising zone 380 may be audited during the inventory auditing process. Similarly, in some instances, a portion of the storage unit 248 that is outside of the merchandising zone 380 may be deemed non-auditable, for example, if there is no room in the merchandising zone 380 and/or the article removal bin 384 for storing non-dispensable articles. In such instances, a portion of the non-merchandising zone in the storage unit 248 may not be audited during the inventory auditing process.

Turning now to the functioning of the machine during a consumer transaction, as a consumer approaches an article dispensing machine 230, the consumer observes the display monitor and the user interface 234. The consumer may also observe, for example, a plasma, LCD, or other type of monitor displaying marketing information, or a lightbox containing marketing information for branding the article dispensing machine 230. The consumer then enters the appropriate commands at the user interface control 234 associated with the article dispensing machine 230 to select a DVD, Blue-Ray disc, video game disc, or other media article to be dispensed by the machine. The user interface control system 234 can employ simple menus and a fixed set of keys for consumers to make their selections, it can employ break-resistant touch screens, or it can employ a combination of both. Once a selection has been made, the consumer then merely inserts his/her magnetically encoded dispense activation card into the card reader 240 positioned at the front of the dispensing machine 230 and, in response, the machine will dispense the selected media article without the need for further input by the consumer.

When the selection has been made, the selector arm 256, in connection with the picker 264, grabs and causes the selected media article to be dispensed, preferably in less than twenty seconds. The specific user request made at the machine (e.g., renting a new movie or payment by credit card) is then sent via satellite feed, DSL, cable modem, the Internet, or other form of communication to a centralized system office in real-time for processing. Such a procedure ensures accurate and rapid handling of every user request as well as secure billing to any credit card account of the consumer.

When a consumer returns a media article to an article dispensing machine 230, he/she, if he/she is a member, can insert the membership card into the card reader 240 on the front of the machine 230, enter his/her personal identification number when prompted and input the appropriate additional commands to initiate the return process. The consumer can insert the media article into the dispensing/receiving receptacle on the front of the machine 230. A bar code reader, which may optionally be the same as the second sensor 370 attached to the selector arm 256, then scans the returned media article for its unique identifier, and the selector arm 256 and the picker 264 attached thereto place the returned media article into an appropriate area of the machine 230 (e.g., storage racks 250, merchandising zone 380, or article removing bin 384) depending on a status of the returned article (e.g., damaged, unknown, DNR, fraudulent, thinned, wrong title, etc.).

Figure 8:
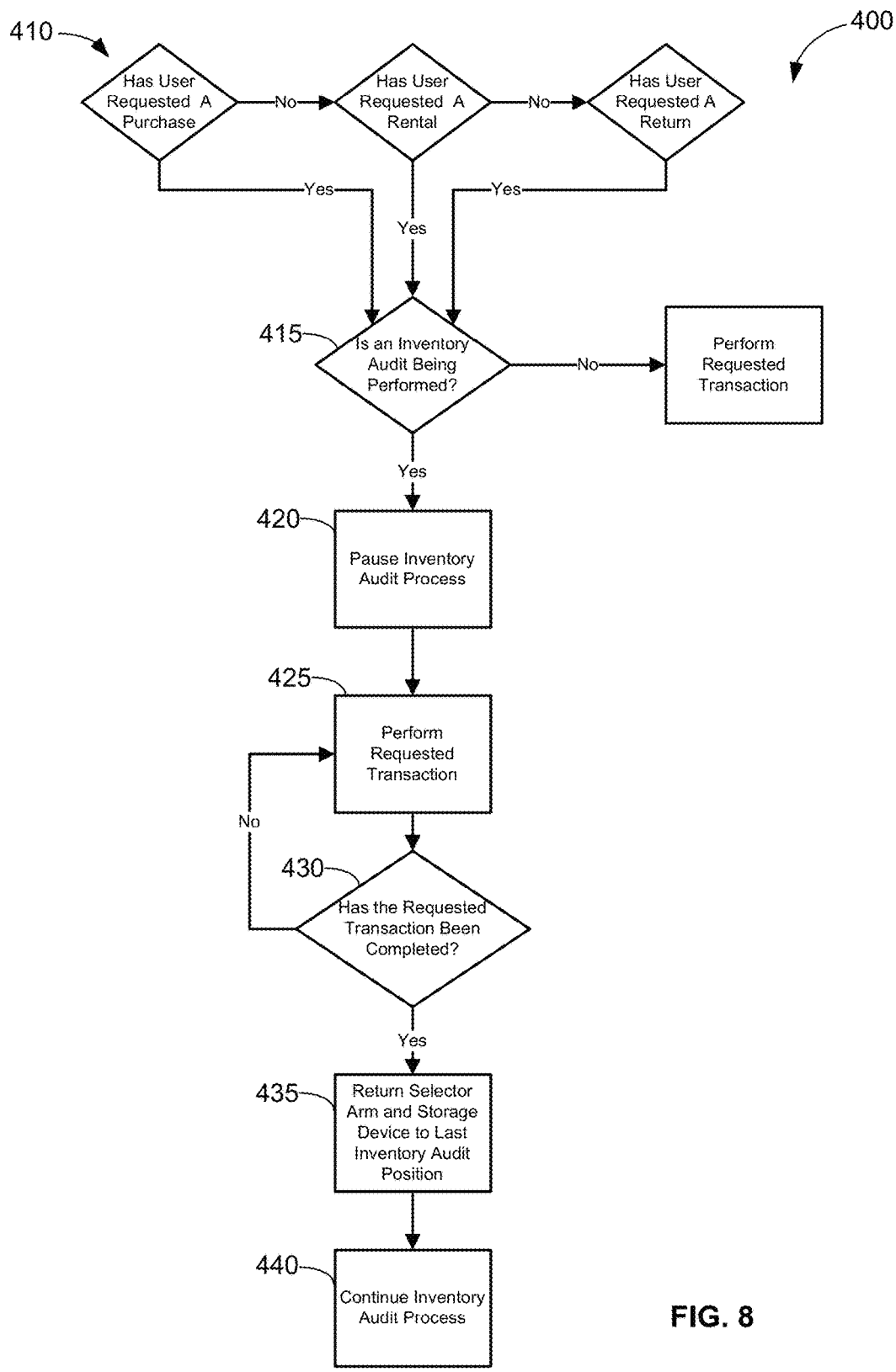
FIG. 8 is a flowchart illustrating an order of operations performed by an article dispensing machine for servicing a requested transaction during the inventory auditing operation of FIG. 6.

As shown in FIG. 7, during the inventory auditing process 500, the user interface 234, which typically includes a touch screen or keypad 242, remains available for use by a customer. A method 400 for pausing the inventory auditing process 500 is shown in FIG. 8. Using the user interface 234, a customer may initiate a transaction such as, e.g., a video purchase 408, rental 409, or return 410, which requires the use of the selector arm 256. In step 415, the program determines whether an inventory audit is being performed at the time of the transaction request. If an inventory audit is being performed, the inventory auditing program, in response to the requested transaction, instructs the processor 300 to pause the execution of the inventory auditing program, as shown in step 420.

In response to the requested transaction, the inventory auditing program may first assess whether an article has been removed from its compartment. The program may do so in a number of ways, for example, by receiving a signal indicating the position or last movement of the picker 264 or by assessing whether the program has more recently instructed the picker 264 to remove an article from its storage compartment 369 or to replace an article to its storage compartment 369. If an article has been removed from its compartment 369, the program instructs the picker 264 to return the article to its storage compartment 369 prior to permitting the execution of the requested transaction. The various components of the machine 230, including the selector arm 256, perform the transaction requested by the user as described above in detail, which may require the second sensor 270 to read information from the returned or requested media article and may further require transport of the returned or requested media article, as shown in step 425.

When the transaction is completed, the inventory auditing process is resumed as shown in steps 430, 435, and 440. The inventory auditing program directs motors 251 and 262 to position the selector arm 256 adjacent to the compartment 369 with which it was aligned when the inventory auditing process was paused. Or, as described above, if this next compartment falls within the merchandizing zone 380, or is otherwise designated as "non-auditable," the selector arm 256 may be positioned at the next auditable storage compartment. The inventory auditing program resumes at the point at which it was paused and continues to scan each auditable storage compartment 369 as described above until completion of the program. When all auditable storage compartments 369 have been audited, the inventory auditing program stops.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

What is claimed is:

1. An article dispensing machine comprising:
   a storage rack for storing a plurality of articles;
   a robotic arm comprising a first sensor and an arm motor configured to drive the robotic arm;
   a housing enclosing the storage rack, the robotic arm, the housing defining an article transfer opening;
   a processor configured to:
      communicate with the arm motor,
      communicate with the first sensor,
      perform an audit routine at least by controlling the arm motor,
      perform a delivery routine at least by controlling the arm motor,
      while performing the audit routine and in response to a recognized presence of an event, pause the audit routine, perform the delivery routine, and upon concluding the delivery routine, resume the audit routine.

2. The article dispensing machine of claim 1, further comprising:
   a storage rack motor configured to drive the storage rack;
   wherein the processor is configured to control the storage rack motor and the arm motor.

3. The article dispensing machine of claim 2, further comprising a conveyer belt and a conveyer belt motor configured to drive the conveyer belt, the processor being configured to communicate with the conveyer belt motor.

4. The article dispensing machine of claim 2, wherein the storage rack motor is configured to rotate the storage rack.

5. The article dispensing machine of claim 4, wherein the robotic arm comprises a U-shaped picker.

6. The article dispensing machine of claim 5, wherein the housing comprises a molded fiberglass.

7. The article dispensing machine of claim 1, wherein the processor is configured to perform the audit routine at least by:
   commanding the robotic arm to address a plurality of different locations of the storage rack, and
   recording a reading of the first sensor during each address.

8. The article dispensing machine of claim 7, wherein the processor is configured to perform the delivery routine at least by:
   commanding the robotic arm to address a specified location of the storage rack,
   commanding the robotic arm to displace an article resident at the specified location from the specified location to an intermediate location,
   wherein the article dispensing machine is configured to automatically transfer the displaced article from the intermediate location to the article transfer opening and thereby enable user access to the transferred article.

9. The article dispensing machine of claim 8, wherein the processor is configured to perform the delivery routine at least by:
   after commanding the robotic arm to displace the article resident at the specified location from the specified location to an intermediate location, issue a command causing the article dispensing machine to transfer the displaced article from the intermediate location to the article transfer opening.

10. The article dispensing machine of claim 9, wherein the article transfer opening is a rectangular slot.

11. The article dispensing machine of claim 9, wherein the robotic arm comprises a second sensor and the processor is configured to perform the audit routine at least by:
    based on a first reading of the first sensor during the address, command the robotic arm to displace an article resident on the storage rack,
    upon displacing the article, record a reading of the second sensor, and
    upon recording the reading of the second sensor, command the robotic arm to return the displaced article to the storage rack.

12. The article dispensing machine of claim 11, wherein the processor is configured to perform the audit routine at least by:
    based on a second reading of the first sensor during the address, command the robotic arm to address a new location of the plurality of locations.

13. The article dispensing machine of claim 12, wherein the first reading corresponds to a presence of an article at the addressed location and the second reading corresponds to an absence of an article at the addressed location.

14. The article dispensing machine of claim 9, wherein the event is a user-initiated transaction and upon recognizing the presence of the user-initiated transaction, the processor is configured to:
    pause the audit routine, perform the delivery routine, and upon concluding the delivery routine, resume the audit routine.

15. The article dispensing machine of claim 14, wherein the processor is configured to pause the audit routine at least by:
    determining whether an article resident on the storage rack has been displaced during the audit routine performance,
    if the determination is positive, returning the displaced article to a prior position of the displaced article, then performing the delivery routine,
    if the determination is negative, then performing the delivery routine.

16. The article dispensing machine of claim 15, wherein the processor is configured to resume the audit routine immediately after concluding the delivery routine.

17. The article dispensing machine of claim 16, wherein the processor is configured to resume the audit routine at by re-addressing a last location addressed during the audit routine.

18. The article dispensing machine of claim 16, wherein the processor is configured to:
    perform the audit routine by addressing the plurality of different locations of the storage rack in a specified order,
    resume the audit routine by either:
        re-addressing a last location addressed during the audit routine, or
        addressing a location, of the plurality of different locations, that immediately follows the last addressed location in the specified order.

19. A method of controlling an article dispensing machine, the article dispensing machine comprising:
    a storage rack for storing a plurality of articles;
    a robotic arm comprising a first sensor and an arm motor configured to drive the robotic arm;
    a housing enclosing the storage rack, the robotic arm, the housing defining an article transfer opening;

a processor configured to communicate with the arm motor and to communicate with the first sensor;

the method comprising, via the processor:

performing an audit routine at least by controlling the arm motor, recognizing a presence of an event, based thereon, pausing the audit routine and performing a delivery routine at least by controlling the arm motor, upon concluding the delivery routine, resuming the audit routine.

20. The method of claim 19, comprising immediately resuming the audit routine upon concluding the delivery routine.

21. The method of claim 20, wherein the article dispensing machine comprises a storage rack motor configured to rotate the storage rack.

22. The method of claim 20, wherein the robotic arm comprises a U-shaped picker.

23. The method of claim 20, wherein the housing comprises a molded fiberglass and a sheet metal.

24. The method of claim 20, wherein the article dispensing machine comprises a conveyer belt and a conveyer belt motor configured to drive the conveyer belt, the processor being configured to communicate with the conveyer belt motor.

25. The method of claim 20, wherein the step of performing the audit routine comprises:

commanding the robotic arm to address a plurality of different locations of the storage rack, and recording a reading of the first sensor during each address.

26. The method of claim 25, wherein the step of performing the delivery routine comprises:

commanding the robotic arm to address a specified location of the storage rack, commanding the robotic arm to displace an article resident at the specified location from the specified location to an intermediate location, wherein the article dispensing machine is configured to automatically transfer the displaced article from the intermediate location to the article transfer opening and thereby enable user access to the transferred article.

27. The method of claim 26, wherein the event is a user-initiated transaction at the article dispensing machine.

28. The method of claim 25, wherein the robotic arm comprises a second sensor and the step of performing the audit routine comprises:

based on a first reading of the first sensor during the address, commanding the robotic arm to displace an article resident on the storage rack, upon displacing the article, recording a reading of the second sensor, and upon recording the reading of the second sensor, commanding the robotic arm to return the displaced article to the storage rack.

29. An article dispensing machine configured to store a plurality of articles, the article dispensing machine comprising:

a first sensor;

a robotic arm comprising an arm motor configured to drive the robotic arm;

a housing for enclosing the plurality of articles, the housing defining an article transfer opening;

a processor configured to:

communicate with the arm motor, communicate with the first sensor, perform an audit routine at least by controlling the arm motor, perform a delivery routine at least by controlling the arm motor, while performing the audit routine and in response to a recognized presence of an event, pause the audit routine, perform the delivery routine, and upon concluding the delivery routine, resume the audit routine.

30. The article dispensing machine of claim 29, wherein the processor is configured such that performance of the delivery routine causes the article dispensing machine to transfer a stored article to the article transfer opening.

31. The article dispensing machine of claim 30, wherein the processor is configured such that performance of the audit routine causes the first sensor to sense a plurality of different stored articles.

32. The article dispensing machine of claim 31, wherein the processor is configured to scan the plurality of different stored articles according to a specified order.

33. The article dispensing machine of claim 32, wherein the processor is configured to immediately resume the audit routine upon concluding the delivery routine and during the audit routine the processor audits the plurality of different stored articles in the specified order.

34. The article dispensing machine of claim 33, wherein the processor is configured such that no article sensed during the audit routine is delivered, during the audit routine, to the article transfer opening.

* * * * *

UNITED STATES PATENT AND TRADEMARK OFFICE
CERTIFICATE OF CORRECTION

PATENT NO. : 9,886,809 B2  
APPLICATION NO. : 13/588967  
DATED : February 6, 2018  
INVENTOR(S) : Eric J. Hoersten et al.

Page 1 of 1

It is certified that error appears in the above-identified patent and that said Letters Patent is hereby corrected as shown below:

On the Title Page

Please amend (63) to read:

Continuation-in-part of application No. 12/833,754, filed on Jul. 9, 2010, which is a continuation of application No. 11/863,909, filed on Sep. 28, 2007, a continuation-in-part of application No. 13/414,597, filed on Mar. 7, 2012, now Pat. No. 8,721,872, and a continuation-in-part of application No. 13/414,612, filed on Mar. 7, 2012, now Pat. No. 8,768,789.

Signed and Sealed this  
Tenth Day of July, 2018

Andrei Iancu  
*Director of the United States Patent and Trademark Office*